US012494210B2

(12) United States Patent
Malenovsky et al.

(10) Patent No.: US 12,494,210 B2
(45) Date of Patent: Dec. 9, 2025

(54) METHOD AND DEVICE FOR CLASSIFICATION OF UNCORRELATED STEREO CONTENT, CROSS-TALK DETECTION, AND STEREO MODE SELECTION IN A SOUND CODEC

(71) Applicant: VOICEAGE CORPORATION, Town of Mount Royal (CA)

(72) Inventors: Vladimir Malenovsky, Brno (CZ); Tommy Vaillancourt, Sherbrooke (CA)

(73) Assignee: VOICEAGE CORPORATION, Town of Mount Royal (CA)

( * ) Notice: Subject to any disclaimer, the term of this patent is extended or adjusted under 35 U.S.C. 154(b) by 284 days.

(21) Appl. No.: 18/041,772

(22) PCT Filed: Sep. 8, 2021

(86) PCT No.: PCT/CA2021/051238

§ 371 (c)(1),
(2) Date: Feb. 15, 2023

(87) PCT Pub. No.: WO2022/051846

PCT Pub. Date: Mar. 17, 2022

(65) Prior Publication Data

US 2024/0021208 A1 Jan. 18, 2024

Related U.S. Application Data

(60) Provisional application No. 63/075,984, filed on Sep. 9, 2020.

(51) Int. Cl.
*G10L 19/008* (2013.01)

(52) U.S. Cl.
CPC .................................. *G10L 19/008* (2013.01)

(58) Field of Classification Search
CPC ....... G10L 19/008; G10L 19/24; G10L 19/22; G10L 25/78; G10L 25/06; H04S 1/007;
(Continued)

(56) References Cited

U.S. PATENT DOCUMENTS 6,041,295 A 3/2000 Hinderks
6,151,571 A 11/2000 Pertrushin
(Continued)

FOREIGN PATENT DOCUMENTS

JP H06-236200 8/1994
JP 2003-522965 7/2003
(Continued)

OTHER PUBLICATIONS

3GPP TS 26.445 V12 "Universal Mobile Telecommunications System (UMTS); LTE;EVS Codec Detailed Algorithmic Description", v.12.0.0, Nov. 5, 2014, pp. 1-71.
(Continued)

*Primary Examiner* — Duc Nguyen
*Assistant Examiner* — Chimezie Ezeriwe Bekee
(74) *Attorney, Agent, or Firm* — Fay Kaplun & Marcin, LLP

(57) ABSTRACT

A method and device selecting one of a first stereo mode and a second stereo mode for coding a stereo sound signal including a left channel and a right channel, comprises producing a first output indicative of a presence or absence of uncorrelated stereo content in the stereo sound signal, producing a second output indicative of a presence or absence of cross-talk in the stereo sound signal, calculating auxiliary parameters for use in selecting the stereo mode for coding a stereo sound signal, and selecting the stereo mode for coding a stereo sound signal in response to the first output, the second output and the auxiliary parameters.

50 Claims, 14 Drawing Sheets

(58) Field of Classification Search
CPC ............. H04S 2400/01; H04S 2400/03; H04S 2420/03; H04R 27/00
USPC .................. 700/94; 704/240, 19.039; 341/50
See application file for complete search history.

(56) References Cited

U.S. PATENT DOCUMENTS

| | | | | |
|---|---|---|---|---|
| 7,835,906 | B1 * | 11/2010 | Miao | G10L 19/22 704/229 |
| 10,325,606 | B2 | 6/2019 | Vaillancourt et al. | |
| 10,522,157 | B2 | 12/2019 | Vaillancourt et al. | |
| 2004/0109471 | A1 | 6/2004 | Minde et al. | |
| 2007/0016418 | A1 | 1/2007 | Mehrotra et al. | |
| 2009/0182563 | A1 | 7/2009 | Schobben et al. | |
| 2012/0101813 | A1 * | 4/2012 | Vaillancourt | G10L 19/08 704/500 |
| 2017/0150258 | A1 * | 5/2017 | Wen | H04B 3/32 |
| 2018/0358024 | A1 | 12/2018 | Pobloth et al. | |
| 2020/0035252 | A1 * | 1/2020 | Choo | G10L 19/12 |
| 2020/0168232 | A1 | 5/2020 | Nagisetty et al. | |
| 2020/0357417 | A1 * | 11/2020 | Nagisetty | G10L 19/22 |

FOREIGN PATENT DOCUMENTS

| | | |
|---|---|---|
| JP | 2009-524846 | 7/2009 |
| JP | 2011-527762 | 11/2011 |
| JP | 2013-033189 | 2/2013 |
| JP | 2018-513408 | 5/2018 |

OTHER PUBLICATIONS

3GPP SA4 contribution S4-170749 "New WID on EVS Codec Extension for Immersive Voice and Audio Services", SA4 meeting #94, Jun. 26-30, 2017, 4 sheets.

Baumgarte et al., "Binaural cue coding—Part I: Psychoacoustic fundamentals and Design principles," IEEE Trans. Speech Audio Processing, vol. 11, Nov. 2003, pp. 509-519.

Zhang et al., "kNN approach to unbalanced data distributions: A case study involving information extraction," In Proceedings of the Workshop on Learning from Imbalanced Data Sets, 2003, 7 sheets.

Malenovsky et al., "Two-stage speech/music classifier with decision smoothing and sharpening in the EVS codec," 2015 IEEE International Conference on Acoustics, Speech and Signal Processing (ICASSP), Brisbane, QLD, 2015, pp. 5718-5722.

Neuendorf et al., "MPEG Unified Speech and Audio Coding—The ISO/MPEG Standard for High-Efficiency Audio Coding of all Content Types", Journal of the Audio Engineering Society, vol. 61, No. 12, Dec. 2013, pp. 956-977.

Maalouf, "Logistic regression in data analysis: An overview", 2011 International Journal of Data Analysis Techniques and Strategies. 3, Jul. 2011, 21 sheets. 10.1504/IJDATS.2011.041335.

Ruder, "An overview of gradient descent optimization algorithms". 2016, ArXiv Preprint ArXiv:1609.04747, 14 sheets.

* cited by examiner

METHOD AND DEVICE FOR CLASSIFICATION OF UNCORRELATED STEREO CONTENT, CROSS-TALK DETECTION, AND STEREO MODE SELECTION IN A SOUND CODEC

TECHNICAL FIELD

The present disclosure relates to sound coding, in particular but not exclusively to classification of uncorrelated stereo content, cross-talk detection, and stereo mode selection in, for example, a multi-channel sound codec capable of producing a good sound quality in a complex audio scene at low bit-rate and low delay.

In the present disclosure and the appended claims:

The term "sound" may be related to speech, audio and any other sound;

The term "stereo" is an abbreviation for "stereophonic"; and

The term "mono" is an abbreviation for "monophonic".

BACKGROUND

Historically, conversational telephony has been implemented with handsets having only one transducer to output sound only to one of the user's ears. In the last decade, users have started to use their portable handset in conjunction with a headphone to receive the sound over their two ears mainly to listen to music but also, sometimes, to listen to speech. Nevertheless, when a portable handset is used to transmit and receive conversational speech, the content is still mono but presented to the user's two ears when a headphone is used.

With the newest 3GPP speech coding standard, EVS (Enhanced Voice Services) as described in Reference [1] of which the full content is incorporated herein by reference, the quality of the coded sound, for example speech and/or audio, that is transmitted and received through a portable handset has been significantly improved. The next natural step is to transmit stereo information such that the receiver gets as close as possible to a real life audio scene that is captured at the other end of the communication link.

In audio codecs, for example as described in Reference [2] of which the full content is incorporated herein by reference, transmission of stereo information is normally used.

For conversational speech codecs, mono signal is the norm. When a stereo sound signal is transmitted, the bitrate is often doubled since both the left and right channels of the stereo sound signal are coded using a mono codec. This works well in most scenarios, but presents the drawbacks of doubling the bitrate and failing to exploit any potential redundancy between the two channels (left and right channels of the stereo sound signal). Furthermore, to keep the overall bitrate at a reasonable level, a very low bitrate for each of the left and right channels is used, thus affecting the overall sound quality. To reduce the bitrate, efficient stereo coding techniques have been developed and used. As non-limitative examples, two stereo coding techniques that can be efficiently used at low bitrates are discussed in the following paragraphs.

A first stereo coding technique is called parametric stereo. Parametric stereo encodes two inputs (left and right channels) as mono signals using a common mono codec plus a certain amount of stereo side information (corresponding to stereo parameters) which represents a stereo image. The two input left and right channels are down-mixed into a mono signal and the stereo parameters are then computed. This is usually performed in frequency domain (FD), for example in the Discrete Fourier Transform (DFT) domain. The stereo parameters are related to so-called binaural or inter-channel cues. The binaural cues (see for example Reference [3], of which the full content is incorporated herein by reference) comprise Interaural Level Difference (ILD), Interaural Time Difference (ITD) and Interaural Correlation (IC). Depending on the sound signal characteristics, stereo scene configuration, etc., some or all binaural cues are coded and transmitted to the decoder. Information about what binaural cues are coded and transmitted is sent as signaling information, which is usually part of the stereo side information. Also, a given binaural cue can be quantized using different coding techniques which results in a variable number of bits being used. Then, in addition to the quantized binaural cues, the stereo side information may contain, usually at medium and higher bitrates, a quantized residual signal that results from the down-mixing. The residual signal can be coded using an entropy coding technique, e.g. an arithmetic encoder. In the remainder of the present disclosure, parametric stereo will be referred to as "DFT stereo" since the parametric stereo encoding technology usually operates in frequency domain and the present disclosure will describe a non-restrictive embodiment using DFT.

Another stereo coding technique is a technique operating in time-domain. This stereo coding technique mixes the two inputs (left and right channels) into so-called primary and secondary channels. For example, following the method as described in Reference [4], of which the full content is incorporated herein by reference, time-domain mixing can be based on a mixing ratio, which determines respective contributions of the two inputs (left and right channels) upon production of the primary and secondary channels. The mixing ratio is derived from several metrics, for example normalized correlations of the two inputs (left and right channels) with respect to a mono signal or a long-term correlation difference between the two inputs (left and right channels). The primary channel can be coded by a common mono codec while the secondary channel can be coded by a lower bitrate codec. Coding of the secondary channel may exploit coherence between the primary and secondary channels and might re-use some parameters from the primary channel. In certain sounds where the left and right channels exhibit little correlation, it is better to encode the left channel and the right channel of the stereo input signal in time domain either separately or with minimum inter-channel parametrization. Such approach in the encoder is a special case of time domain TD stereo and will be called "LRTD stereo" throughout the present disclosure.

Further, in last years, the generation, recording, representation, coding, transmission, and reproduction of audio is moving towards enhanced, interactive and immersive experience for the listener. The immersive experience can be described, for example, as a state of being deeply engaged or involved in a sound scene while sounds are coming from all directions. In immersive audio (also called 3D (Three-Dimensional) audio), the sound image is reproduced in all three dimensions around the listener, taking into consideration a wide range of sound characteristics like timbre, directivity, reverberation, transparency and accuracy of (auditory) spaciousness. Immersive audio is produced for a particular sound playback or reproduction system such as loudspeaker-based-system, integrated reproduction system (sound bar) or headphones. Then, interactivity of a sound reproduction system may include, for example, an ability to adjust sound levels, change positions of sounds, or select different languages for the reproduction.

There exist three fundamental approaches to achieve an immersive experience.

A first approach to achieve an immersive experience is a channel-based audio approach using multiple spaced microphones to capture sounds from different directions, wherein one microphone corresponds to one audio channel in a specific loudspeaker layout. Each recorded channel is then supplied to a loudspeaker in a given location. Examples of channel-based audio approaches are, for example, stereo, 5.1 surround, 5.1+4, etc.

A second approach to achieve an immersive experience is a scene-based audio approach which represents a desired sound field over a localized space as a function of time by a combination of dimensional components. The sound signals representing the scene-based audio are independent of the positions of the audio sources while the sound field is transformed to a chosen layout of loudspeakers at the renderer. An example of scene-based audio is ambisonics.

The third approach to achieve an immersive experience is an object-based audio approach which represents an auditory scene as a set of individual audio elements (for example singer, drums, guitar, etc.) accompanied by information such as their position, so they can be rendered by a sound reproduction system at their intended locations. This gives the object-based audio approach a great flexibility and interactivity because each object is kept discrete and can be individually manipulated.

Each of the above described audio approaches to achieve an immersive experience presents pros and cons. It is thus common that, instead of only one audio approach, several audio approaches are combined in a complex audio system to create an immersive auditory scene. An example can be an audio system that combines scene-based or channel-based audio with object-based audio, for example ambisonics with a few discrete audio objects.

In recent years, 3GPP (3 rd Generation Partnership Project) started working on developing a 3D (Three-Dimensional) sound codec for immersive services called IVAS (Immersive Voice and Audio Services), based on the EVS codec (See Reference [5] of which the full content is incorporated herein by reference).

The DFT stereo mode is efficient for coding single-talk utterances. In case of two or more speakers it is difficult for the parametric stereo technology to fully describe the spatial properties of the scene. This problem is especially evident when two talkers are talking simultaneously (cross-talk scenario) and when the signals in the left channel and the right channel of the stereo input signal are weakly correlated or completely uncorrelated. In that situation it is better to encode the left channel and the right channel of the stereo input signal in time domain either separately or with minimum inter-channel parametrization using the LRTD stereo mode. As the scene captured in the stereo input signal evolves it is desirable to switch between the DFT stereo mode and the LRTD stereo mode based on stereo scene classification.

SUMMARY

According to a first aspect, the present disclosure relates to a method for classifying uncorrelated stereo content in a stereo sound signal including a left channel and a right channel in response to features extracted from the stereo sound signal including the left and right channels, comprising: calculating a score representative of uncorrelated stereo content in the stereo sound signal in response to the extracted features; and in response to the score, switching between a first class indicative of one of uncorrelated and correlated stereo content in the stereo sound signal and a second class indicative of the other of the uncorrelated and correlated stereo content.

According to a second aspect, the present disclosure provides a classifier of uncorrelated stereo content in a stereo sound signal including a left channel and a right channel in response to features extracted from the stereo sound signal including the left and right channels, comprising: a calculator of a score representative of uncorrelated stereo content in the stereo sound signal in response to the extracted features; and a class switching mechanism responsive to the score for switching between a first class indicative of one of uncorrelated and correlated stereo content in the stereo sound signal and a second class indicative of the other of the uncorrelated and correlated stereo content.

The present disclosure is also concerned with a method for detecting cross-talk in a stereo sound signal including a left channel and a right channel in response to features extracted from the stereo sound signal including the left and right channels, comprising: calculating a score representative of cross-talk in the stereo sound signal in response to the extracted features; calculating auxiliary parameters for use in detecting cross-talk in the stereo sound signal; and in response to the cross-talk score and the auxiliary parameters, switching between a first class indicative of a presence of cross-talk in the stereo sound signal and a second class indicative of an absence of cross-talk in the stereo sound signal.

According to a further aspect, the present disclosure provides a detector of cross-talk in a stereo sound signal including a left channel and a right channel in response to features extracted from the stereo sound signal including the left and right channels, comprising: a calculator of a score representative of cross-talk in the stereo sound signal in response to the extracted features; a calculator of auxiliary parameters for use in detecting cross-talk in the stereo sound signal; and a class switching mechanism responsive to the cross-talk score and the auxiliary parameters for switching between a first class indicative of a presence of cross-talk in the stereo sound signal and a second class indicative of an absence of cross-talk in the stereo sound signal.

The present disclosure is also concerned with a method for selecting one of a first stereo mode and a second stereo mode for coding a stereo sound signal including a left channel and a right channel, comprising: producing a first output indicative of a presence or absence of uncorrelated stereo content in the stereo sound signal; producing a second output indicative of a presence or absence of cross-talk in the stereo sound signal; calculating auxiliary parameters for use in selecting the stereo mode for coding a stereo sound signal; and selecting the stereo mode for coding a stereo sound signal in response to the first output, the second output and the auxiliary parameters.

According to a still further aspect, the present disclosure provides a device for selecting one of a first stereo mode and a second stereo mode for coding a stereo sound signal including a left channel and a right channel, comprising: a classifier for producing a first output indicative of a presence or absence of uncorrelated stereo content in the stereo sound signal; a detector for producing a second output indicative of a presence or absence of cross-talk in the stereo sound signal; an analysis processor for calculating auxiliary parameters for use in selecting the stereo mode for coding a stereo sound signal; and a stereo mode selector for selecting the stereo mode for coding a stereo sound signal in response to the first output, the second output and the auxiliary parameters.

The foregoing and other objects, advantages and features of the uncorrelated stereo content classifier and classifying method, the cross-talk detector and detecting method, and the stereo mode selecting device and method will become more apparent upon reading of the following non-restrictive description of illustrative embodiments thereof, given by way of example only with reference to the accompanying drawings.

DETAILED DESCRIPTION

The present disclosure describes the classification of uncorrelated stereo content (hereinafter "UNCLR classification") and the cross-talk detection (hereinafter "XTALK detection") in an input stereo sound signal. The present disclosure also describes the stereo mode selection, for example an automatic LRTD/DFT stereo mode selection.

Figure 1:
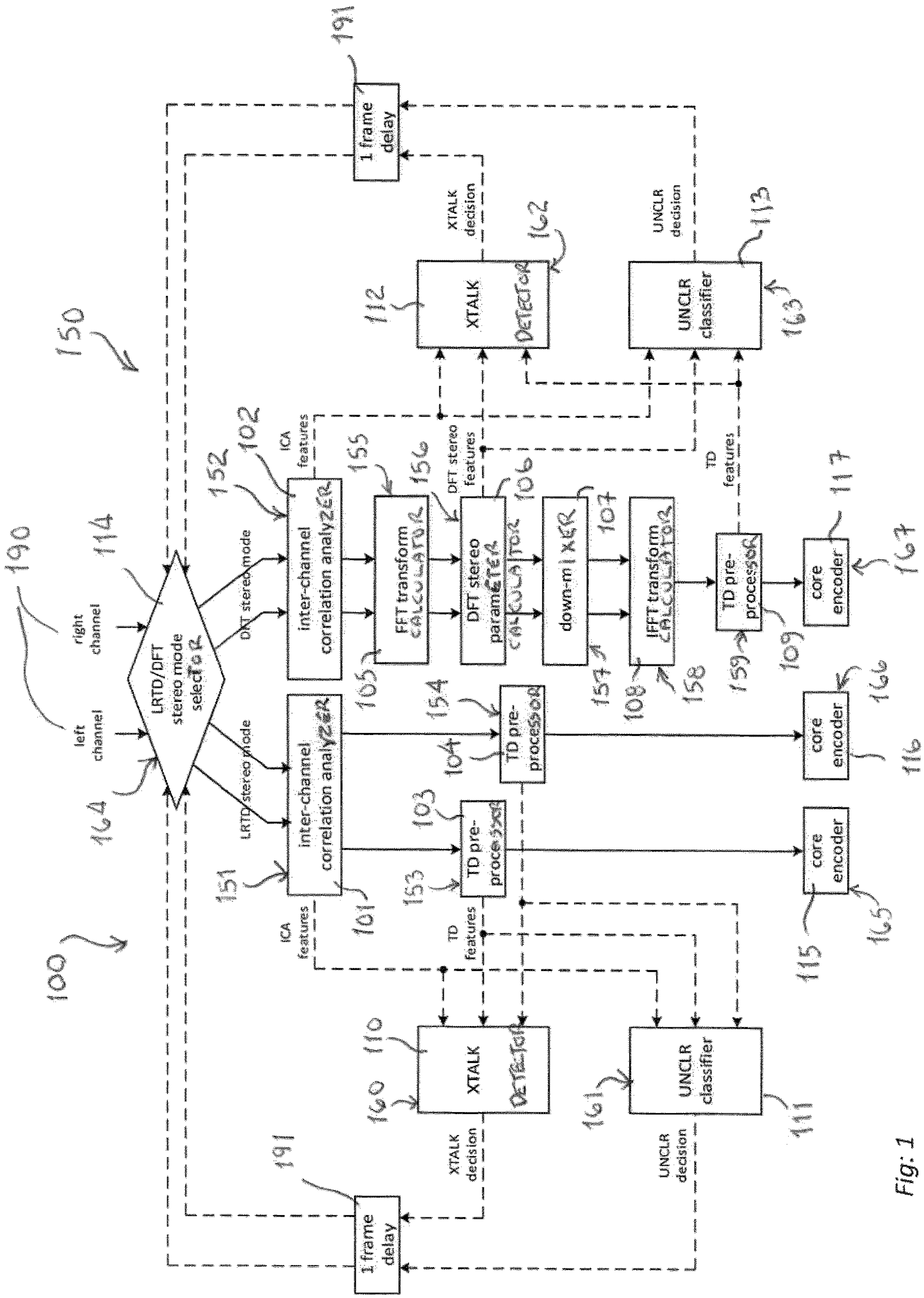
FIG. 1 is a schematic block diagram illustrating concurrently a device for coding a stereo sound signal and a corresponding method for coding the stereo sound signal.

FIG. 1 is a schematic block diagram illustrating concurrently a device 100 for coding a stereo sound signal 190 and a corresponding method 150 for coding the stereo sound signal 190.

In particular, FIG. 1 shows how the UNCLR classification, the XTALK detection, and the stereo mode selection are integrated within the stereo sound signal coding method 150 and device 100.

The UNCLR classification and the XTALK detection form two independent technologies. However, they are based on a same statistical model and share some features and parameters. Also, both the UNCLR classification and the XTALK detection are designed and trained individually for the LRTD stereo mode and the DFT stereo mode. In the present disclosure, the LRTD stereo mode is given as a non-limitative example of time-domain stereo mode and the DFT stereo mode is given as a non-limitative example of frequency-domain stereo mode. It is within the scope of the present disclosure to implement other time-domain and frequency-domain stereo modes.

The UNCLR classification analyzes features extracted from the left and right channels of the stereo sound signal 190 and detects a weak or zero correlation between the left and right channels. The XTALK detection, on the other hand, detects the presence of two speakers speaking at the same time in a stereo scene. For example, both the UNCLR classification and the XTALK detection provide binary outputs. These binary outputs are combined together in a stereo mode selection logic. As a non-limitative general rule, the stereo mode selection selects the LRTD stereo mode when the UNCLR classification and the XTALK detection indicate the presence of two speakers standing on opposite sides of a capturing device (for example a microphone). This situation usually results in weak correlation between the left channel and the right channel of the stereo sound signal 190. The selection of the LRTD stereo mode or the DFT stereo mode is performed on a frame-by-frame basis (As well known in the art, the stereo sound signal 190 is sampled at a given sampling rate and processed by groups of these samples called "frames" divided into a number of "sub-frames"). Also, the stereo mode selection logic is designed to avoid frequent switching between the LRTD and DFT stereo modes and stereo mode switching within signal segments that are perceptually important.

Non-limitative, illustrative embodiments of the UNCLR classification, the XTALK detection, and the stereo mode selection will be described in the present disclosure, by way of example only, with reference to an IVAS coding framework referred to as IVAS codec (or IVAS sound codec). However, it is within the scope of the present disclosure to incorporate such classification, detection and selection in any other sound codec.

1. FEATURE EXTRACTION

The UNCLR classification is based on the Logistic Regression (LogReg) model as described for example in Reference [9], of which the full content is incorporated herein by reference. The LogReg model is trained individually for the LRTD stereo mode and for the DFT stereo mode. The training is done using a large database of features extracted from the stereo sound signal coding device 100 (stereo codec). Similarly, the XTALK detection is based on the LogReg model which is trained individually for the LRTD stereo mode and for the DFT stereo mode. The features used in the XTALK detection are different from the features used in the UNCLR classification. However, certain features are shared by both technologies.

The features used in the UNCLR classification and the features used in the XTALK detection are extracted from the following operations:

Inter-channel correlation analysis;

TD pre-processing; and

DFT stereo parametrization.

The method 150 for coding the stereo sound signal comprises an operation (not shown) of extraction of the above-mentioned features. To perform the operation of feature extraction, the device 100 for coding a stereo sound signal comprises a feature extractor (not shown).

2. INTER-CHANNEL CORRELATION ANALYSIS

The operation (not shown) of feature extraction comprises an operation 151 of inter-channel correlation analysis for the LRTD stereo mode and an operation 152 of inter-channel correlation analysis for the DFT stereo mode. To perform operations 151 and 152, the feature extractor (not shown) comprises an analyzer 101 of inter-channel correlation and an analyzer 102 of inter-channel correlation, respectively. Operations 151 and 152 as well as analyzers 101 and 102 are similar and will be described concurrently.

The analyzer 101/102 receives as input the left channel and right channel of a current stereo sound signal frame. The left and right channels are first down-sampled to 8 kHz. Let, for example, the down-sampled left and right channels be denoted as:

$$X_L(n), X_R(n), n=0, \ldots, N-1 \quad (1)$$

where n is a sample index in the current frame and N=160 is a length of the current frame (length of 160 samples). The down-sampled left and right channels are used to calculate an inter-channel correlation function. First, an absolute energy of the left channel and the right channel is calculated using, for example, the following relations:

$$E_L = \sum_{n=0}^{N-1} X_L^2(n) \quad (2)$$
$$E_R = \sum_{n=0}^{N-1} X_R^2(n)$$

The analyzer 101/102 calculates the numerator of the inter-channel correlation function from the dot product between the left channel and the right channel over a range of lags <−40,40>. For negative lags, the dot product between the left channel and the right channel is calculated, for example, using the following relation:

$$C(k) = \sum_{n=0}^{N-1} X_L(n) X_R(n+k), \quad k = -40, \ldots, 0 \quad (3)$$

and, for positive lags, the dot product is given, for example, by the following relation:

$$C(k) = \sum_{n=0}^{N-1} X_L(n-k) X_R(n), \quad k = 1, \ldots, 40 \quad (4)$$

The analyzer 101/102 then calculates the inter-channel correlation function using, for example, the following relation:

$$R(k) = \frac{1}{2N} \frac{C(k) + C^{[-1]}(k)}{\sqrt{\left(E_L + E_L^{[-1]}\right)^2 \left(E_R + E_R^{[-1]}\right)^2}}, \quad k = -40, \ldots, 40 \quad (5)$$

where the superscript [−1] denotes reference to the previous frame. A passive mono signal is calculated by taking average over the left and the right channels:

$$X_M(n) = \frac{X_L(n) + X_R(n)}{2}, \quad n = 0, \ldots, N-1 \quad (6)$$

A side signal is calculated as a difference between the left and the right channels using, as a non-limitative example, the following relation:

$$X_s(n) = \frac{X_L(n) - X_R(n)}{2}, \quad n = 0, \ldots, N-1 \quad (7)$$

Finally, it is also useful to define the per-sample product of the left and right channel as:

$$X_P(n) = X_L(n) \cdot X_R(n), n=0, \ldots, N-1 \quad (8)$$

The analyzer 101/102 comprises an Infinite Impulse Response (IIR) filter (not shown) for smoothing the inter-channel correlation function using, for example, the following relation:

$$R_{LT}^{[b]}(k) = \alpha_{ICA} R_{LT}^{[n-1]}(k) + (1-\alpha_{ICA}) R^{[n]}(k), \quad k=-40, \ldots, 40 \quad (9)$$

where the superscript [n] denotes the current frame, superscript [n−1] denotes the previous frame, and $\alpha_{ICA}$ is a smoothing factor.

The smoothing factor $\alpha_{ICA}$ is set adaptively within the Inter-Channel Correlation Analysis (ICA) module (Reference [1]) of the stereo sound signal coding device 100 (stereo codec). The inter-channel correlation function is then weighted at locations in the region of the predicted peak. The mechanism for peak finding and local windowing is implemented within the ICA module and will not be described in this document; See Reference [1] for additional information about the ICA module. Let's denote the inter-channel correlation function after ICA weighting as $R_w(k)$ with $k \in$ <−40,40>.

The position of the maximum of the inter-channel correlation function is an important indicator of the direction from which the dominant sound is coming to the capturing point, and is used as a feature by the UNCLR classification and the XTALK detection in the LRTD stereo mode. The analyzer 101/102 calculates the maximum of the inter-channel correlation function also used as a feature by the XTALK detection in the LRTD stereo mode using, for example, the following relation:

$$R_{max} = \max_k [R_w(k)],\quad k = -40, \ldots, 40 \tag{10}$$

and the position of this maximum using, as a non-limitative embodiment, the following relation:

$$k_{max} = \arg\max_k [R_w(k)],\quad k = -40, \ldots, 40 \tag{11}$$

When the maximum $R_{max}$ of the inter-channel correlation function is negative it is set to 0. The difference between the maximum value $R_{max}$ in the current frame and the previous frame is calculated, for example, as:

$$d_{R\,max} = R_{max} - R_{max}^{[-1]} \tag{12}$$

where the superscript [−1] denotes reference to the previous frame.

The position of the maximum of the inter-channel correlation function determines which channel become a "reference" channel (REF) and a "target" channel (TAR) in the ICA module. If the position $k_{max} \geq 0$ the left channel (L) is the reference channel (REF) and the right channel (R) is the target channel (TAR). If $k_{max} < 0$ the right channel (R) is the reference channel (REF) and the left channel (L) is the target channel (TAR). The target channel (TAR) is then shifted to compensate for its delay with respect to the reference channel (REF). The number of samples used to shift the target channel (TAR) can, for example, be set directly to $|k_{max}|$. However, to eliminate artifacts resulting from abrupt changes in position $k_{max}$ between consecutive frames, the number of samples used to shift the target channel (TAR) may be smoothed with a suitable filter within the ICA module.

Let the number of samples used to shift the target channel (TAR) be denoted as $k_{shift}$, where $k_{shift} > 0$. Let the reference channel signal be denoted $X_{ref}(n)$ and the target channel signal be denoted $X_{tar}(n)$. The instantaneous target gain reflects the ratio of energies between the reference channel (REF) and the shifted target channel (TAR). The instantaneous target gain can be calculated, for example, using the following relation:

$$g_t = \log 10\left(\frac{\sum_{n=0}^{N-k_{shift}} |X_{ref}(n)|}{\sum_{n=k_{shift}}^{N} |X_{tar}(n)|} + 1.0\right) \tag{13}$$

where N is the frame length. The instantaneous target gain is used as a feature by the UNCLR classification in the LRTD stereo mode.

2.1 Inter-Channel Features

The analyzer 101/102 derives a first series of features used in the UNCLR classification and the XTALK detection directly from the inter-channel analysis. The value of the inter-channel correlation function at zero lag, R(0), is used as a feature on its own by the UNCLR classification and the XTALK detection in the LRTD stereo mode. By computing the logarithm of the absolute value of C(0) another feature used by the UNCLR classification and the XTALK detection in the LRTD stereo mode is obtained, as follows:

$$p_{LR}(n) = \log_{10}\left|\sum_{n=0}^{N-1} X_L(n)\cdot X_R(n)\right| = \log_{10}|C(0)|,\quad n = 0, \ldots, N-1 \tag{14}$$

The ratio of energies of the side signal and the mono signal is also used as a feature by the UNCLR classification and the XTALK detection in the LRTD stereo mode. This ratio is calculated using, for example, the following relation:

$$r_{SM}(n) = \left|10\log_{10}\sqrt{\frac{\sum_{n=0}^{N-1} X_S^2(n)}{\sum_{n=0}^{N-1} X_M^2(n)}}\right| \tag{15}$$

The ratio of energies of relation (15) is smoothed over time for example as follows:

$$\overline{r_{SM}}(n) = \begin{cases} 0.9\overline{r_{SM}}(n-1) & \text{if } c_{hang} \neq 0 \\ 0.9\overline{r_{SM}}(n-1) + 0.1 r_{SM}(n) & \text{otherwise} \end{cases} \tag{16}$$

where $c_{hang}$ is a counter of VAD (Voice Activity Detection) hangover frames which is calculated as part of the VAD module (See for example Reference [1]) of the stereo sound signal coding device 100 (stereo codec). The smoothed ratio of relation (16) is used as a feature by the XTALK detection in the LRTD stereo mode.

The analyzer 101/102 derives the following dot products from the left channel and the mono signal and between the right channel and the mono signal. First, the dot product between the left channel and the mono signal is expressed for example as:

$$C_{LM} = \sum_{n=0}^{N-1} X_L(n) X_M(n) \tag{17}$$

and the dot product between the right channel and the mono signal for example as:

$$C_{RM} = \sum_{n=0}^{N-1} X_R(n) X_M(n) \tag{18}$$

Both dot products are positive with a lower bound of 0. A metric based on the difference of the maximum and the minimum of these two dot products is used as a feature by the UNCLR classification and the XTALK detection in the LRTD stereo mode. It can be calculated using the following relation:

$$d_{mmLR} = \max[C_{LM}, C_{RM}] - \min[C_{LM}, C_{RM}] \tag{19}$$

A similar metric, used as a standalone feature by the UNCLR classification and the XTALK detection in the LRTD stereo mode, is based directly on the absolute difference between the two dot products both, in linear and in logarithmic domain, calculated using for example the following relations:

$$\Delta_{LRM}=C_{LM}-C_{RM}$$

$$d_{LRM}=\log_{10}|C_{LM}-C_{RM}| \quad (20)$$

A last feature used by the UNCLR classification and the XTALK detection in the LRTD stereo mode is calculated as part of the inter-channel correlation analysis operation 151/152 and reflects the evolution of the inter-channel correlation function. It may be calculated as follows:

$$RR=\frac{\sum_{k=-40}^{40} R(k)R^{[-2]}(k)}{\sqrt{\sum_{k=-40}^{40} R^2(k)\sum_{k=-40}^{40}\left(R^{[-2]}\right)^2(k)}} \quad (21)$$

where the superscript [−2] denotes reference to the second frame preceding the current frame.

3. TIME-DOMAIN (TD) PRE-PROCESSING

In the LRTD stereo mode, there is no mono down-mixing and both the left and right channels of the input stereo sound signal 190 are analyzed in respective time-domain pre-processing operations to extract features, i.e. operation 153 for time-domain pre-processing the left channel and operation 154 for time-domain pre-processing the right channel of the stereo sound signal 190. To perform operations 153 and 154, the feature extractor (not shown) comprises respective time-domain pre-processors 103 and 104 as shown in FIG. 1. Operations 153 and 154 as well as the corresponding pre-processors 103 and 104 are similar and will be described concurrently.

The time-domain pre-processing operation 153/154 performs a number of sub-operations to produce certain parameters that are used as extracted features for conducting UNCLR classification and XTALK detection. Such sub-operations may include:

- spectral analysis;
- linear prediction analysis;
- open-loop pitch estimation;
- voice activity detection (VAD);
- background noise estimation; and
- frame error concealment (FEC) classification.

The time-domain pre-processor 103/104 performs the linear prediction analysis using the Levinson-Durbin algorithm. The output of the Levinson-Durbin algorithm is a set of linear prediction coefficients (LPCs). The Levinson-Durbin algorithm is an iterative method and the total number of iterations in the Levinson-Durbin algorithm may be denoted as M. In each ith iteration, where i=1, . . . , M, residual error energy $e_{LPC}^{[i-1]}$ is calculated. In the present disclosure, as a non-limitative illustrative implementation, it is assumed that the Levinson-Durbin algorithm is run with M=16 iterations. The difference in residual error energy between the left channel and the right channel of the input stereo sound signal 190 is used as a feature for the XTALK detection in the LRTD stereo mode. The difference in residual error energy may be calculated as follows:

$$d_{LPC13}=e_{LPC,L}^{[13]}-e_{LPC,R}^{[13]}| \quad (22)$$

where the subscripts L and R have been added to denote the left channel and the right channel of the input stereo sound signal 190, respectively. In this non-limitative embodiment, the feature (difference $d_{LPC13}$) is calculated using the residual energy from the $14^{th}$ iteration instead of the last iteration as it was found experimentally that this iteration has the highest discriminative potential for the UNCLR classification. More information about the Levinson-Durbin algorithm and details about residual error energy calculation can be found, for example, in Reference [1].

The LPC coefficients estimated with the Levinson-Durbin algorithm are converted into Line Spectral Frequencies, LSF(i), i=0, . . . , M−1. The sum of the LSF values can serve as an estimate of a gravity point of the envelope of the input stereo sound signal 190. The difference between the sum of the LSF values in the left channel and in the right channel contains information about the similarity of the two channels. For that reason, this difference is used as a feature in the XTALK detection in the LRTD stereo mode. The difference between the sum of the LSF values in the left channel and in the right channel may be calculated using the following relation:

$$d_{LSF}=\sum_{i=0}^{M-1}|LSF_L(i)-LSF_R(i)| \quad (23)$$

Additional information about the above mentioned LPC to LSF conversion can be found, for example, in Reference [1].

The time-domain pre-processor 103/104 performs the open-loop pitch estimation and uses an autocorrelation function from which a left channel (L)/right channel (R) open-loop pitch difference is calculated. The left channel (L)/right channel (R) open-loop pitch difference may be calculated using the following relation:

$$d_T=\frac{1}{3}\sum_{k=1}^{3}\left|T_L^{[k]}-T_R^{[k]}\right| \quad (24)$$

where $T^{[k]}$ is the open-loop pitch estimate in the kth segment of the current frame. In the present disclosure it is assumed, as a non-limitative illustrative example, that the open-loop pitch analysis is performed in three adjacent half frames (segments), indexed k=1, 2, 3, where two segments are located in the current frame and one segment is located in the second half of the previous frame. It is possible to use different number of segments as well as different segment length and overlap. Additional information about the open-loop pitch estimation can be found, for example, in Reference [1].

The difference between the maximum autocorrelation values (voicing) of the left and right channels (determined by the above-mentioned autocorrelation function) of the input stereo sound signal 190 is also used as a feature by the XTALK detection in the LRTD stereo mode. The difference between the maximum autocorrelation values of the left and right channels may be calculated using the following relation:

$$d_v=\frac{1}{3}\sum_{k=1}^{3}\left|v_L^{[k]}-v_R^{[k]}\right| \quad (25)$$

where $v^{[k]}$ represents the maximum autocorrelation value of the left (L) and right (R) channels in the kth half-frame.

The background noise estimation is part of the Voice Activity Detection (VAD) detection algorithm (See Reference [1]). Specifically, the background noise estimation uses an active/inactive signal detector (not shown) relying on a set of features some of which are used by the UNCLR classification and the XTALK detection. For example, the active/inactive signal detector (not shown) produces a non-stationarity parameter, $f_{sta}$, of the left channel (L) and the right channel (R) as a measure of spectral stability. A difference in non-stationarity between the left channel and the right channel of the input stereo sound signal 190 is used as a feature by the XTALK detection in the LRTD stereo mode. The difference in non-stationarity between the left (L) and right (R) channels may be calculated using the following relation:

$$d_{sta}=|f_{sta,L}-f_{sta,R}| \tag{26}$$

The active/inactive signal detector (not shown) relies on the harmonic analysis which contains a correlation map parameter $C_{map}$. The correlation map is a measure of tonal stability of the input stereo sound signal 190 and it is used by the UNCLR classification and the XTALK detection. A difference between the correlation maps of the left (L) and right (R) channels is used as a feature by the XTALK detection in the LRTD stereo mode and is calculated using, for example, the following relation:

$$d_{cmap}=|f_{map,L}-f_{map,R}| \tag{27}$$

Finally, the active/inactive signal detector (not shown) takes regular measurements of spectral diversity and noise characteristics in each frame. These two parameters are also used as features by the UNCLR classification and the XTALK detection in the LRTD stereo mode. Specifically, (a) a difference in spectral diversity between the left channel (L) and the right channel (R) may be calculated as follows:

$$d_{sdiv}=|\log(S_{div,L})-\log(S_{div,R})| \tag{28}$$

where $S_{div}$ represents the measure of spectral diversity in the current frame, and (b) a difference of noise characteristics between the left channel (L) and the right channel (R) may be calculated as follows $$d_{nchar}=|\log(n_{char,L})-\log(n_{char,R})| \tag{29}$$

where $n_{char}$ represents the measurement of noise characteristics in the current frame. Reference can be made to [1] for details about the calculation of correlation map, non-stationarity, spectral diversity and noise characteristics parameters.

The ACELP (Algebraic Code-Excited Linear Prediction) core encoder, which is part of the stereo sound signal coding device 100, comprises specific settings for encoding unvoiced sounds as described in Reference [1]. The use of these settings is conditioned by multiple factors, including a measure of sudden energy increase in short segments inside the current frame. The settings for unvoiced sound coding in the ACELP core encoder are only applied when there is no sudden energy increase inside the current frame. By comparing the measures of sudden energy increase in the left channel and in the right channel it is possible to localize the starting position of a cross-talk segment. The sudden energy increase can be calculated similarly to the $E_d$ parameter as described in the 3GPP EVS codec (Reference [1]). The difference in sudden energy increase of the left channel (L) and the right channel (R) may be calculated using the following relation:

$$d_{dE}=\log(E_{d,L})-\log(E_{d,R}) \tag{30}$$

where the subscripts L and R have been added to denote the left channel and the right channel of the input stereo sound signal 190, respectively.

The time-domain pre-processor 103/104 and pre-processing operation 153/154 uses a FEC classification module containing the state machine for FEC technology. A FEC class in each frame is selected among predefined classes based on a function of merit. The difference between FEC classes selected in the current frame for the left channel (L) and the right channel (R) is used as a feature by the XTALK detection in the LRTD stereo mode. However, for the purposes of such classification and detection, the FEC class may be restricted as follows:

$$t_{class}=\begin{cases}\text{VOICED} & \text{if } t_{class}\geq\text{VOICED}\\ \text{UNVOICED} & \text{otherwise}\end{cases} \tag{31}$$

where $t_{class}$ is the selected FEC class in the current frame. Thus, the FEC class is restricted to VOICED and UNVOICED only. The difference between the classes in the left channel (L) and the right channel (R) may be calculated as follows:

$$d_{class}=|t_{class,L}-t_{class,R}| \tag{32}$$

Reference may be made to [1] for additional details about the FEC classification.

The time-domain pre-processor 103/104 and pre-processing operation 153/154 implements a speech/music classification and the corresponding speech/music classifier. This speech/music classification makes a binary decision in each frame according to a power spectrum divergence and a power spectrum stability. A difference in power spectrum divergence between the left channel (L) and the right channel (R) is calculated, for example, using the following relation:

$$d_{Pdiff}=|P_{diff,L}-P_{diff,R}| \tag{33}$$

where $P_{diff}$ represents power spectral divergence in the left channel (L) and the right channel (R) in the current frame, and a difference in power spectrum stability between the left channel (L) and the right channel (R) is calculated, for example, using the following relation $$d_{Psta}=|P_{sta,L}-P_{sta,R}| \tag{34}$$

where $P_{sta}$ represents power spectrum stability in the left channel (L) and the right channel (R) in the current frame.

Reference [1] describes details about the power spectrum divergence and power spectrum stability calculated within the speech/music classification.

4. DFT STEREO PARAMETERS

The method 150 for coding the stereo sound signal 190 comprises an operation 155 of calculating a Fast Fourier Transform (FFT) of the left channel (L) and the right channel (R). To perform the operation 155, the device 100 for coding the stereo sound signal 190 comprises a FFT transform calculator 105.

The operation (not shown) of feature extraction comprises an operation 156 of calculating DFT stereo parameters. To perform operation 156, the feature extractor (not shown) comprises a calculator 106 of DFT stereo parameters.

In the DFT stereo mode, the transform calculator 105 converts the left channel (L) and the right channel (R) of the input stereo sound signal 190 to frequency domain by means of the FFT transform.

Let the complex spectrum of the left channel (L) be denoted as $\tilde{S}_L(k)$ and the complex spectrum of the right channel (R) as $\tilde{S}_R(k)$ with k=0, . . . , $N_{FFT}-1$ being the index of frequency bins and $N_{FFT}$ the length of the FFT transform. For example, when the sampling rate of the input stereo sound signal is 32 kHz, the calculator 106 of DFT stereo parameters calculates the complex spectra over a window of 40 ms resulting in $N_{FFT}=1280$ samples. The complex cross-channel spectrum may be then calculated using, as a non-limitative embodiment, the following relation:

$$X_{LR}(k)=\tilde{S}_L(k)\tilde{S}_R^*(k), k=0, \ldots, N_{FFT}-1 \quad (35)$$

with the star superscript indicating complex conjugate. The complex cross-channel spectrum can be decomposed into the real part and the imaginary part using the following relation:

$$\mathrm{Re}(X_{LR}(k))=\mathrm{Re}(\tilde{S}_L(k))\cdot\mathrm{Re}(\tilde{S}_R(k))+\mathrm{Im}(\tilde{S}_L(k))\cdot\mathrm{Im}(\tilde{S}_R(k)), \quad k=0, \ldots, N_{FFT}-1$$

$$\mathrm{Im}(X_{LR}(k))=\mathrm{Im}(\tilde{S}_L(k))\cdot\mathrm{Re}(\tilde{S}_R(k))-\mathrm{Re}(\tilde{S}_L(k))\cdot\mathrm{Im}(\tilde{S}_R(k)), \quad k=0, \ldots, N_{FFT}-1 \quad (36)$$

Using the real and imaginary parts decomposition, it is possible to express an absolute magnitude of the complex cross-channel spectrum as:

$$|X_{LR}(k)|=\sqrt{\mathrm{Re}(X_{LR}(k))^2+\mathrm{Im}(X_{LR}(k))^2}, k=0, \ldots, N_{FFT}-1 \quad (37)$$

By summing the absolute magnitudes of the complex cross-channel spectrum over the frequency bins using the following relation, the calculator 106 of DFT stereo parameters obtain an overall absolute magnitude of the complex cross-channel spectra:

$$|X_{LR}| = \sum_{k=0}^{N_{FFT}-1} |X_{LR}(k)| \quad (38)$$

The energy spectrum of the left channel (L) and the energy spectrum of the right channel (R) can be expressed as:

$$E_L(k)=\mathrm{Re}(\tilde{S}_L(k))^2+\mathrm{Im}(\tilde{S}_L(k))^2, k=0, \ldots, N_{FFT}-1$$

$$E_R(k)=\mathrm{Re}(\tilde{S}_R(k))^2+\mathrm{Im}(\tilde{S}_R(k))^2, k=0, \ldots, N_{FFT}-1 \quad (39)$$

By summing the energy spectra of the left channel (L) and the energy spectra of the right channel (R) over the frequency bins using the following relations, the total energies of the left channel (L) and the right channel (R) can be obtained:

$$E_L = \sum_{k=0}^{N_{FFT}-1} E_L(k) \quad (40)$$

$$E_R = \sum_{k=0}^{N_{FFT}-1} E_R(k)$$

The UNCLR classification and the XTALK detection in the DFT stereo mode use the overall absolute magnitude of the complex cross-channel spectra as one of their features but not in the direct form as defined above but rather in the energy-normalized form and in the logarithmic domain as expressed using, for example, the following relation:

$$f_X = \sum_{k=0}^{N_{FFT}-1} \log\left(\frac{|X_{LR}(k)|}{E_L + E_R}\right) \quad (41)$$

It is possible for the calculator 106 of DFT stereo parameters to calculate a mono down-mix energy using, for example, the following relation:

$$E_M=E_L+E_R+2|X_{LR}| \quad (42)$$

An Inter-channel Level Difference (ILD) is a feature used by the UNCLR classification and the XTALK detection in the DFT stereo mode as it contains information about the angle from which the main sound is coming. For the purposes of the UNCLR classification and the XTALK detection, the Inter-channel Level Difference (ILD) can be expressed in the form of a gain factor. The calculator 106 of DFT stereo parameters calculates the Inter-channel Level Difference (ILD) gain using, for example, the following relation:

$$g_{ILD} = \left|\frac{\sqrt{E_L/E_R} - 1}{\sqrt{E_L/E_R} + 1}\right| \quad (43)$$

An Inter-channel Phase Difference (IPD) contains information from which the listeners can deduce the direction of the incoming sound signal. The calculator 106 of DFT stereo parameters calculates the Inter-channel Phase Difference (IPD) using, for example, the following relation:

$$IPD = \arctan\left(\frac{\mathrm{Im}(X_{LR})}{\mathrm{Re}(X_{LR})}\right) \quad (44)$$

where $$\mathrm{Re}(X_{LR}) = \sum_{k=0}^{N_{FFT}-1} \mathrm{Re}(X_{LR}(k)) \quad (45)$$

$$\mathrm{Im}(X_{LR}) = \sum_{k=0}^{N_{FFT}-1} \mathrm{Im}(X_{LR}(k))$$

A differential value of the Inter-channel Phase Difference (IPD) with respect to the previous frame is calculated using, for example, the following relation:

$$d_{IPD}=|\mathrm{IPD}^{[n]}-\mathrm{IPD}^{[n-1]}| \quad (46)$$

where the superscript n is used to denote the current frame and the superscript n−1 is used to denote the previous frame. Finally, it is possible for the calculator 106 to calculate an IPD gain as a ratio between a phase-aligned (IPD=0) down-mix energy (numerator of relation (47)) and the energy of the mono down-mix energy $E_M$:

$$g_{IPD\_lin} = \frac{E_L + E_R + 2\mathrm{Re}(X_{LR})}{E_M} \quad (47)$$

The IPD gain $g_{IPD\_lin}$ is restricted to the interval <0,1>. In case the value exceeds the upper threshold of 1.0, then the value of the IPD gain from the previous frame is substituted therefor. The UNCLR classification and the XTALK detection in the DFT stereo mode use the IPD gain in the logarithmic domain as a feature. The calculator 106 determines the IPD gain in the logarithmic domain using, for example, the following relation:

$$g_{IPD}=\log(1-g_{IPD\_lin}) \quad (48)$$

The Inter-channel Phase Difference (IPD) can also be expressed in the form of an angle used as a feature by the UNCLR classification and the XTALK detection in the DFT stereo mode and calculated, for example, as follows:

$$\varphi_{rot} = \arctan\left(\frac{2\mathrm{Re}(X_{LR})}{E_L - E_R}\right) \tag{49}$$

A side channel can be calculated as a difference between the left channel (L) and the right channel (R). It is possible to express a gain of the side channel by calculating the ratio of the absolute value of the energy of this difference ($E_L-E_R$) with respect to the mono down-mix energy $E_M$, using the following relation:

$$g_{side} = \frac{|E_L - E_R|}{E_M} \tag{50}$$

The higher the gain $g_{side}$, the bigger the difference between the energies of the left channel (L) and the right channel (R). The gain $g_{side}$ of a the side channel is restricted to the interval <0.01, 0.99>. Values outside of this range are limited.

The phase difference between the left channel (L) and the right channel (R) of the input stereo sound signal 190 can also be analyzed from a prediction gain calculated using, for example, the following relation:

$$g_{pred\_lin} = (1-g_{side})E_L + (1+g_{side})E_R - 2|X_{LR}| \tag{51}$$

where the value of the prediction gain $g_{pred\_lin}$ is a restricted to the interval <0, ∞>, i.e. to positive values. The above expression of $g_{pred\_lin}$ captures a difference between the cross-channel spectrum ($X_{LR}$) energy and the mono down-mix energy $E_M=E_L+E_R+2|X_{LR}|$. The calculator 106 converts this $g_{pred\_lin}$ into logarithmic domain using, for example, relation (52) for use as a feature by the UNCLR classification and the XTALK detection in the DFT stereo mode:

$$g_{pred} = \log(g_{pred\_lin}+1) \tag{52}$$

The calculator 106 also uses the per-bin channel energies of relation (39) to calculate a mean energy of Inter-Channel Coherence (ICC) forming a cue for determining a difference between the left channel (L) and the right channel (R) not captured by the Inter-channel Time Difference (ITD), to be described hereinafter, and the Inter-channel Phase Difference (IPD). First, the calculator 106 calculates an overall energy of the cross-channel spectrum using, for example, the following relation:

$$E_X = \mathrm{Re}(X_{LR})^2 + \mathrm{Im}(X_{LR})^2 \tag{53}$$

To express the mean energy of the Inter-Channel Coherence (ICC) it is useful to calculate the following parameter:

$$\varphi_{tot} = \sqrt{(E_L - E_R)(E_L - E_R) + 4E_X} \tag{54}$$

Then, the mean energy of the Inter-Channel Coherence (ICC) is used as a feature by the UNCLR classification and the XTALK detection in the DFT stereo mode and can be expressed as $$E_{coh} = 20\log_{10}\left(\frac{E_L + E_R + \varphi_{tot}}{E_L + E_R - \varphi_{tot}}\right) \tag{55}$$

The value of the mean energy $E_{coh}$ is set to 0 if the inner term is less than 1.0. Another possible interpretation of the Inter-Channel Coherence (ICC) is a side-to-mono energy ratio calculated as $$E_{S2M} = \left|\frac{E_L - E_R}{E_L + E_R}\right| \tag{56}$$

Finally, the calculator 106 determines a ratio $r_{pp}$ of maximum and minimum intra-channel amplitude products used in the UNCLR classification and the XTALK detection. This feature, used as a feature by the UNCLR classification and the XTALK detection in the DFT stereo mode, is calculated, for example, using the following relation:

$$r_{PP} = \log\left(1 + \frac{\max(P_L, P_R)}{\min(P_L, P_R)}\right) \tag{57}$$

where the intra-channel amplitude products are defined as follows:

$$P_L = \prod_{k=0}^{N_{FFT}-1} |\tilde{S}_L(k)| \qquad P_R = \prod_{k=0}^{N_{FFT}-1} |\tilde{S}_R(k)| \tag{58}$$

A parameter used in stereo signal reproduction is the Inter-channel Time Difference (ITD). In the DFT stereo mode, the calculator 106 of DFT stereo parameters estimates the Inter-channel Time Difference (ITD) from the Generalized Cross-channel Correlation function with Phase Difference (GCC-PHAT). The Inter-channel Time Difference (ITD) corresponds to a Time Delay of Arrival (TDOA) estimation. The GCC-PHAT function is a robust method for estimating the Inter-channel Time Difference (ITD) on reverberated signals. The GCC-PHAT is calculated, for example, using the following relation:

$$X_{PHAT}(k) = IFFT\left[\frac{X_{LR}}{|X_{LR}|}\right],\ k = 0, \ldots, N_{FFT} - 1 \tag{59}$$

wherein IFFT stands for Inverse Fast Fourier Transform.

The Inter-channel Time Difference (ITD) is then estimated from the GCC-PHAT function using, for example, the following relation:

$$d_{ITD} = \arg\max_d(X_{PHAT}(d)),\ d = -200, \ldots, 200 \tag{60}$$

where d is a time lag in samples corresponding to a time delay in the range from −5 ms to +5 ms. The maximum value of the GCC-PHAT function corresponding to $d_{ITD}$ is used as a feature by the UNCLR classification and the XTALK detection in the DFT stereo mode and can be retrieved using the following relation:

$$G_{ITD} = \max_d(X_{PHAT}(d)),\ d = -200, \ldots, 200 \tag{61}$$

Figure 2:
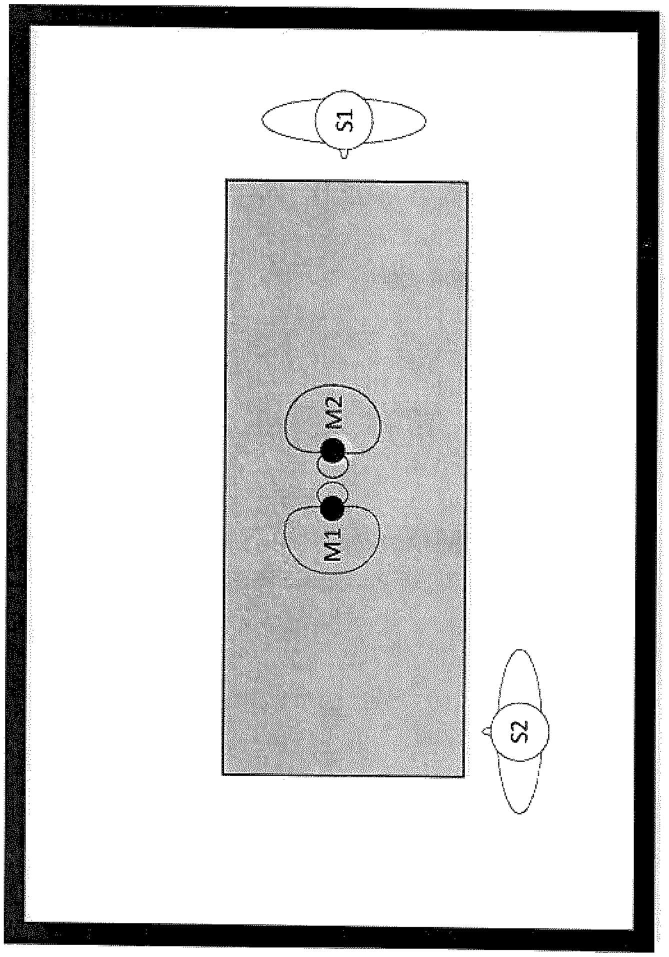
FIG. 2 is schematic diagram showing a plan view of a cross-talk scene with two opposite speakers captured by a pair of hypercardioid microphones.
Figure 3:
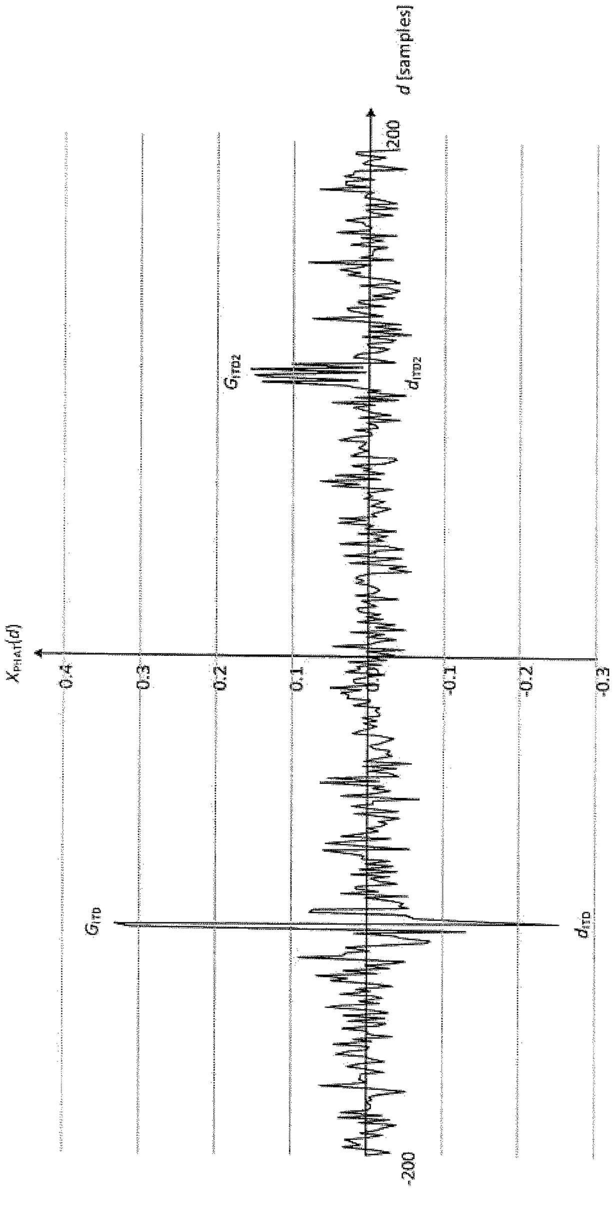
FIG. 3 is a graph showing the location of peaks in a GCC-PHAT function.

In single-talk scenarios there is usually a single dominant peak in the GCC-PHAT function corresponding to the Inter-channel Time Difference (ITD). However, in cross-talk situations with two talkers located on opposite sides of a capturing microphone, there are usually two dominant peaks located apart from each other. FIG. 2 illustrates such a situation. Specifically, according to a non-restrictive illustrative example, FIG. 2 is a plan view of a cross-talk scene with two opposite talkers S1 and S2 captured by a pair of hypercardioid microphones M1 and M2, and FIG. 3 is a graph showing the location of the two dominant peaks in the GCC-PHAT function.

The amplitude of the first peak, $G_{ITD}$, is calculated using relation (61) and its position, $d_{ITD}$, is calculated using relation (60). The amplitude of the second peak is localized by searching for the second maximum value of the GCC-PHAT function in an inverse direction with respect to the first peak. More specifically, the direction $s_{ITD}$ of searching of the second peak is determined by the sign of the position $d_{ITD}$ of the first peak:

$$s_{ITD}=\mathrm{sgn}(d_{ITD}) \tag{62}$$

where sgn(.) is the sign function.

The calculator 106 of DFT stereo parameters can then retrieve the second maximum value of the GCC-PHAT function in the direction $s_{ITD}$ (second highest peak) using, for example, the following relation:

$$G_{ITD2}=\begin{cases}\max\limits_{d}(X_{PHAT}(d))\ d=thr_{xt},\ \ldots\ ,200 & \text{if } s_{ITD}<0\\ \max\limits_{d}(X_{PHAT}(d))\ d=-200,\ \ldots\ ,-thr_{xt} & \text{if } s_{ITD}>0\end{cases} \tag{63}$$

As a non-limitative embodiment, a threshold $thr_{xt}$=8 ensures that the second peak of the GCC-PHAT function is searched at a distance of at least 8 samples from the beginning ($d_{ITD}$=0). As far as the detection of cross-talk (XTALK) is concerned, this means that any potential secondary talker in the scene will have to be present at least a certain minimum distance apart both from the first "dominant" talker and from the middle point (d=0).

The position of the second highest peak of the GCC-PHAT function is calculated using relation (63) by replacing the max(.) function with arg max(.) function. The position of the second highest peak of the GCC-PHAT function will be denoted as $d_{ITD2}$.

The relationship between the amplitudes of the first peak and the second highest peak of the GCC-PHAT function is used as a feature by the XTALK detection in the DFT stereo mode and can be evaluated using the following ratio:

$$r_{GITD12}=\frac{|G_{ITD}G_{ITD2}|}{|G_{ITD}+G_{ITD2}|} \tag{64}$$

The ratio $r_{GITD12}$ has a high discrimination potential but, in order to use it as a feature, the XTALK detection eliminates occasional false alarms resulting from a limited time resolution applied during frequency transformation in the DFT stereo mode. This can be done by multiplying the value of the ratio $r_{GITD12}$ in the current frame with the value of the same ratio from the previous frame using, for example, the following relation:

$$r_{GITD12}\leftarrow r_{GITD12}(n)\cdot r_{GITD12}(n-1) \tag{65}$$

where the index n has been added to denote the current frame and the index n−1 to denote the previous frame. For simplicity the parameter name, $r_{GITD12}$, is reused to identify the output parameter.

The amplitude of the second highest peak alone constitutes an indicator of the strength of the secondary talker in the scene. Similarly to the ratio $r_{GITD12}$, occasional random "spikes" of the value $G_{ITD2}$ are reduced using, for example, the following relation (66) to obtain another feature used by the XTALK detection in the DFT stereo mode:

$$m_{ITD2}=G_{ITD2}(n)\cdot G_{ITD2}(n-1) \tag{66}$$

Another feature used in the XTALK detection in the DFT stereo mode is the difference of the position $d_{ITD2}(n)$ of the second highest peak in the current frame with respect to the previous frame, calculated using, for example, the following relation:

$$\Delta_{ITD2}=|d_{ITD2}(n)-d_{ITD2}(n-1)| \tag{67}$$

5. DOWN-MIXING AND INVERSE FAST FOURIER TRANSFORM (IFFT)

In the DFT stereo mode, the method 150 for coding the stereo sound signal comprises an operation 157 of down-mixing the left channel (L) and the right channel (R) of the stereo sound signal 190 and an operation 158 of calculating an IFFT transform of the down-mixed signals. To perform the operations 157 and 158, the device 100 for coding the stereo sound signal 190 comprises a down-mixer 107 and an IFFT transform calculator 108.

The down-mixer 107 down-mixes the left channel (L) and the right channel (R) of the stereo sound signal into a mono channel (M) and a side channel (S), as described, for example, in Reference [6], of which the full content is incorporated herein by reference.

The IFFT transform calculator 108 then calculates an IFFT transform of the down-mixed mono channel (M) from the down-mixer 107 for producing a time-domain mono channel (M) to be processed in the TD pre-processor 109. The IFFT transform used in calculator 108 is the inverse of the FFT transform used in calculator 105.

6. TD PRE-PROCESSING IN DFT STEREO MODE

In the DFT stereo mode, the operation (not shown) of feature extraction comprises a TD pre-processing operation 159 for extracting features used in the UNCLR classification and the XTALK detection. To perform operation 159, the feature extractor (not shown) comprises the TD pre-processor 109 responsive to the mono channel (M).

6.1 Voice Activity Detection

The UNCLR classification and the XTALK detection use a Voice Activity Detection (VAD) algorithm. In the LRTD stereo mode, the VAD algorithm is run separately on the left channel (L) and the right channel (R). In the DFT stereo mode, the VAD algorithm is run on the down-mixed mono channel (M). The output of the VAD algorithm is a binary flag $f_{VAD}$. The VAD flag $f_{VAD}$ is not suitable for the UNCLR classification and the XTALK detection as it is too conservative and has a long hysteresis. This prevents fast switching between the LRTD stereo mode and the DFT stereo mode for example at the end of talk spurts or during short pauses in the middle of an utterance. Also, the VAD flag $f_{VAD}$ is sensitive to small changes in the input stereo sound signal 190. This leads to false alarms in cross-talk detection and incorrect selection of the stereo mode. Therefore, the UNCLR classification and the XTALK detection use an alternative measure of voice activity detection which is based on variations of the relative frame energy. Reference is made to [1] for details about the VAD algorithm.

6.1.1 Relative Frame Energy

The UNCLR classification and the XTALK detection use the absolute energy of the left channel (L) $E_L$ and the absolute energy of the right channel (R) $E_R$ obtained using relation (2). The maximum average energy of the input stereo sound signal can be calculated in the logarithmic domain using, for example, the following relation:

$$E_{ave}(n) = 10\log_{10}\frac{\max(E_L(n), E_R(n))}{N} \tag{68}$$

where the index n has been added to denote the current frame and N=160 is the length of the current frame (length of 160 samples). The value of the maximum average energy in the logarithmic domain $E_{ave}(n)$ is limited to the interval <0;∞>.

A relative frame energy of the input stereo sound signal can then be calculated by mapping the maximum average energy $E_{ave}(n)$ linearly in the interval <0; 0,9>, using, for example, the following relation:

$$E_{rl} = [E_{ave}(n) - E_{dn}(n)]\frac{0.9}{E_{up}(n) - E_{dn}(n)} \tag{69}$$

where $E_{up}(n)$ denotes an upper bound of the relative frame energy $E_{rl}(n)$, $E_{dn}(n)$ denotes a lower bound of the relative frame energy $E_{rl}(n)$, and the index n denotes the current frame.

The bounds of the relative frame energy $E_{rl}(n)$ are updated in each frame based on a noise updating counter $a_{En}(n)$, which is part of the noise estimation module of the TD pre-processors 103, 104 and 109. Reference is made to [1] for additional information about this counter. The purpose of the counter $a_{En}(n)$ is to signal that the background noise level in each channel in the current frame can be updated. This situation happens when the value of the counter $a_{En}(n)$ is zero. As a non-limitative example, the counter $a_{En}(n)$ in each channel is initialized to 6 and incremented or decremented in every frame with a lower threshold of 0 and an upper threshold of 6.

In the case of LRTD stereo mode, noise estimation is performed on the left channel (L) and the right channel (R) independently. Let us denote the two noise updating counters as $a_{En,L}(n)$ and $a_{En,R}(n)$ for the left channel (L) and the right channel (R), respectively. The two counters can then be combined into a single binary parameter with the following relation:

$$f_{En}(n) = \begin{cases} 1, & \text{if } a_{En,L}(n) = 6 \text{ OR } a_{En,R}(n) = 6 \\ 0, & \text{otherwise} \end{cases} \tag{70a}$$

In the case of the DFT stereo mode, noise estimation is performed on the down-mixed mono channel (M). Let us denote the noise update counter in the mono channel as $a_{En,M}(n)$. The binary output parameter is calculated with the following relation:

$$f_{En}(n) = \begin{cases} 1, & \text{if } a_{En,M}(n) = 6 \\ 0, & \text{otherwise} \end{cases} \tag{70b}$$

The UNCLR classification and the XTALK detection use the binary parameter $f_{En}(n)$ to enable updating of the lower bound $E_{dn}(n)$ or the upper bound $E_{up}(n)$ of the relative frame energy $E_{rl}(n)$. When the parameter $f_{En}(n)$ is equal to zero the lower bound $E_{dn}(n)$ is updated. When the parameter $f_{En}(n)$ is equal to 1 the upper bound $E_{up}(n)$ is updated.

The upper bound $E_{up}(n)$ of the relative frame energy $E_{rl}(n)$ is updated in frames where the parameter $f_{En}(n)$ is equal to 1 using, for example, the following relation:

$$E_{up}(n) = \begin{cases} 0.99E_{up}(n-1) + 0.01E_{ave}(n), & \text{if } E_{ave}(n) < E_{up}(n-1) \\ 0.95E_{up}(n-1) + 0.05E_{ave}(n), & \text{otherwise} \end{cases} \tag{71}$$

where the index n represents the current frame and the index n−1 represents the previous frame.

The first and second lines in relation (71) represent a slower update and a faster update, respectively. Thus, using relation (71) the upper bound $E_{up}(n)$ is updated more rapidly when the energy increases.

The lower bound $E_{dn}(n)$ of the relative frame energy $E_{rl}(n)$ is updated in frames where the parameter $f_{En}(n)$ is equal to 0 using, for example, the following relation:

$$E_{dn}(n)=0.9E_{dn}(n-1)+0.1E_{ave}(n) \tag{72}$$

with a lower threshold of 30.0. If the value of the upper bound $E_{up}(n)$ gets too close to the lower bound $E_{dn}(n)$, it is modified, as an example, as follows:

$$E_{up}(n)=E_{dn}(n)+20.0, \text{if } E_{up}(n)<E_{dn}(n)+20.0 \tag{73}$$

6.1.2 Alternative VAD Flag Estimation

The UNCLR classification and the XTALK detection use the variation of the relative frame energy $E_{rl}(n)$, calculated in relations (71) as a basis for calculating an alternative VAD flag. Let the alternative VAD flag in the current frame be denoted as $f_{xVAD}(n)$. The alternative VAD flag $f_{xVAD}(n)$ is calculated by combining the VAD flags generated in the noise estimation module of the TD pre-processor 103/104 in the case of the LRTD stereo mode, or the VAD flag $f_{VAD}$ generated in TD pre-processor 109 in the case of the DFT stereo mode, with an auxiliary binary parameter $f_{Erl}(n)$ reflecting the variations of the relative frame energy $E_{rl}(n)$.

First, the relative frame energy $E_{rl}(n)$ is averaged over a segment of 10 previous frames using, for example, the following relation:

$$\overline{E_{rl}}(p) = \frac{1}{10-p}\sum_{k=p}^{9} E_{rl}(n-k),\ p = 0, \ldots, 2 \tag{74}$$

where p is the index of the average. The auxiliary binary parameter is set, for example, according to the following logic:

$$f_{Erl}(n) = \begin{cases} 0, & \text{if } \overline{E_{rl}}(0) < 0.1 \\ 0, & \text{if } E_{rl}(n) < 0.3 \text{ AND } \overline{E_{rl}}(1) < 0.1 \\ 0, & \text{if } E_{rl}(n) < 0.5 \text{ AND } \overline{E_{rl}}(2) < 0.17 \\ 1, & \text{otherwise} \end{cases} \tag{75}$$

In the LRTD stereo mode, the alternative VAD flag $f_{xVAD}(n)$ is calculated by means of a logical combination of the VAD flag in the left channel (L), $f_{VAD,L}(n)$, the VAD flag in the right channel (R), $f_{VAD,R}(n)$, and the auxiliary binary parameter $f_{Erl}(n)$ using, for example, the following relation:

$$f_{xVAD}(n)=(f_{VAD,L}(n) \text{ OR } f_{VAD,R}(n)) \text{ AND } f_{Erl}(n) \tag{76}$$

In the DFT stereo mode, the alternative VAD flag $f_{xVAD}(n)$ is calculated by means of a logical combination of the VAD flag in the down-mixed mono channel (M), $f_{VAD,M}(n)$, and the auxiliary binary parameter $f_{Erl}(n)$, using, for example, the following relation.

$$f_{xVAD}(n)=f_{VAD,M}(n) \text{ AND } f_{Erl}(n) \tag{77}$$

6.2 Stereo Silence Flag

In the DFT stereo mode, it is also convenient to calculate a discrete parameter reflecting low level of the down-mixed mono channel (M). Such parameter, called stereo silence flag, can be calculated, for example, by comparing the average level of the active signal to a certain predefined threshold. As an example, the long-term active speech level, $\overline{N}_{sp}(n)$, calculated within the VAD algorithm of the TD pre-processor 109 can be used as a basis for calculating the stereo silence flag. Reference is made to [1] for details about the VAD algorithm.

The stereo silence flag can then be calculated using the following relation:

$$f_{sil}(n)=\begin{cases} 2 & \text{if } \overline{N}_{sp}(n)-E_M(n)>25 \\ f_{sil}(n-1)-1 & \text{otherwise} \end{cases} \tag{78}$$

where $E_M(n)$ is the absolute energy of the down-mixed mono channel (M) in the current frame. The stereo silence flag $f_{sil}(n)$ is limited to the interval <0,∞>.

7. CLASSIFICATION OF UNCORRELATED STEREO CONTENT (UNCLR)

The UNCLR classification in the LRTD stereo mode and the DFT stereo mode is based on the Logistic Regression (LogReg) model (See Reference [9]). The LogReg model is trained individually for the LRTD stereo mode and the DFT stereo mode on a large labeled database consisting of correlated and uncorrelated stereo signal samples. The uncorrelated stereo training samples are created artificially, by combining randomly selected mono samples. The following stereo scenes may be simulated with such artificial mix of mono samples:

- speaker A in the left channel, speaker B in the right channel (or vice-versa);
- speaker A in the left channel, music sound in the right channel (or vice-versa);
- speaker A in the left channel, noise sound in the right channel (or vice-versa);
- speaker A in the left or right channel, background noise in both channels;
- speaker A in the left or right channel, background music in both channels.

In a non-limitative implementation, the mono samples are selected from the AT&T mono clean speech database sampled at 16 kHz. Only active segments are extracted from the mono samples using any convenient VAD algorithm, for example the VAD algorithm of the 3GPP EVS codec as described in Reference [1]. The total size of the stereo training database with uncorrelated content is approximately 240 MB. No level adjustment is applied on the mono signals before they are combined to form the stereo sound signal. Level adjustment is applied only after this process. The level of each stereo sample is normalized to −26 dBov based on passive mono down-mix. Thus, the inter-channel level difference is unchanged and remains the main factor determining the position of the dominant speaker in the stereo scene.

Figure 4:
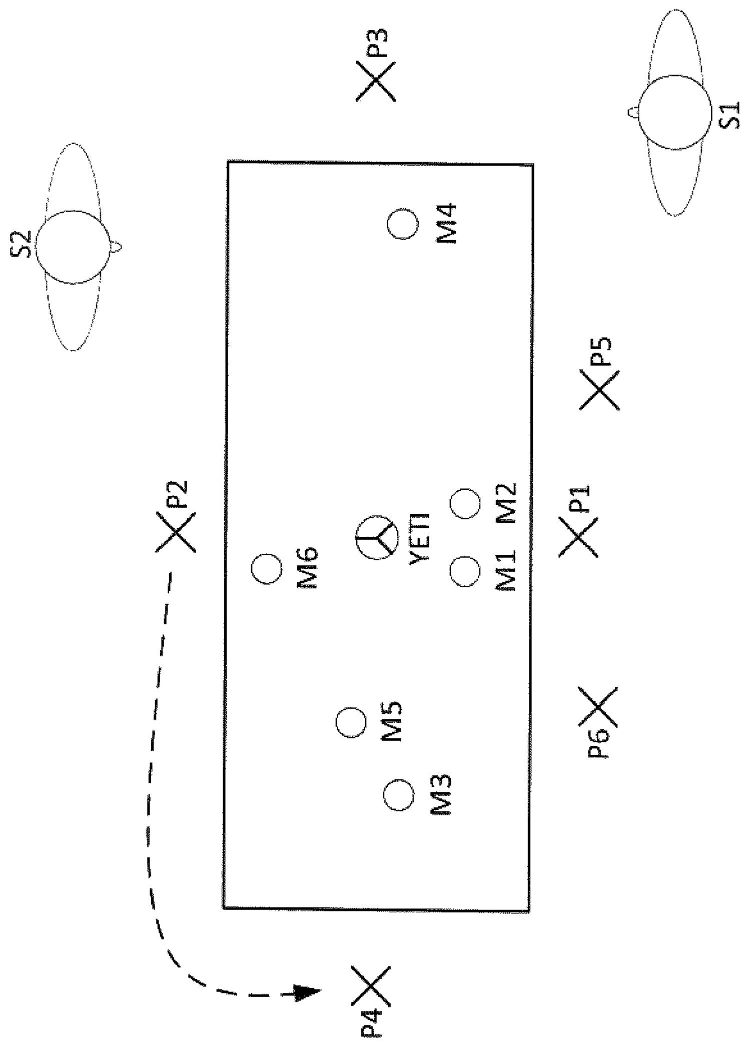
FIG. 4 is a top plan view of a stereo scene set-up for real recordings.

The correlated stereo training samples are obtained from various real recordings of stereo sound signals. The total size of the training database with correlated stereo content is approximately 220 MB. The correlated stereo training samples contain, in a non-limitative implementation, samples from the following scenes illustrated in FIG. 4, showing a top plan view of a stereo scene set-up for real recordings:

- speaker S1 at position P1, closer to microphone M1, speaker S2 at position P2, closer to microphone M6;
- speaker S1 at position P4, closer to microphone M3, speaker S2 at position P3, closer to microphone M4;
- speaker S1 at position P6, closer to microphone M1, speaker S2 at position P5, closer to microphone M2;
- speaker S1 only at position P4 in a M1-M2 stereo recording;
- speaker S1 only at position P4 in a M3-M4 stereo recording.

Let the total size of the training database be denoted as:

$$N_T=N_{UNC}+N_{CORR} \tag{79}$$

where $N_{UNC}$ is the size of the set of uncorrelated stereo training samples and $N_{CORR}$ the size of the set of correlated stereo training samples. The labels are assigned manually using, for example, the following simple rule:

$$y(i)=\begin{cases} 1, & i\in\Omega_{UNC} \\ 0, & i\in\Omega_{CORR} \end{cases} \tag{80}$$

where $\Omega_{UNC}$ is the entire feature set of the uncorrelated training database and $\Omega_{CORR}$ is the entire feature set of the correlated training database. In this illustrative, non-restrictive implementation, the inactive frames (VAD=0) are discarded from the training database.

Each frame in the uncorrelated training database is labeled "1" and each frame in the correlated training database is labeled "0". Inactive frames for which VAD=0 are ignored during the training process.

7.1 UNCLR Classification in LRTD Stereo Mode

In the LRTD stereo mode, the method 150 for coding the stereo sound signal 190 comprises an operation 161 of classification of uncorrelated stereo content (UNCLR). To perform operation 161, the device 100 for coding the stereo sound signal 190 comprises an UNCLR classifier 111.

The operation 161 of UNCLR classification in the LRTD stereo mode is based on the Logistic Regression (LogReg) model. The following features extracted by running the device 100 for coding the stereo sound signal (stereo codec) on both the uncorrelated stereo and correlated stereo training databases are used in the UNCLR classification operation 161:

- the position of the maximum of the inter-channel cross-correlation function, $k_{max}$ (Relation (11));
- the instantaneous target gain, $g_t$ (Relation (13);
- the logarithm of the absolute value of the inter-channel correlation function at zero lag, $p_{LR}$ (Relation (14));
- the side-to-mono energy ratio, $r_{SM}$ (Relation (15));
- the difference between the maximum and minimum of the dot products between the left/right channel and the mono signal, $d_{mmLR}$ (Relation (19));

the absolute difference, in the logarithmic domain, between the dot product between the left channel (L) and the mono signal (M) and the dot product between the right channel and the mono signal (M), $d_{LRM}$ (Relation (20));

the zero-lag value of the cross-channel correlation function, $R_0$ (Relation (5)); and the evolution of the inter-channel correlation function, RR (Relation (21)).

In total, the UNCLR classifier 111 uses a number F=8 of features.

Before the training process, the UNCLR classifier 111 comprises a normalizer (not shown) performing a sub-operation (not shown) of normalizing the set of features by removing its mean and scaling it to unit variance. The normalizer (not shown) uses, for that purpose, for example the following relation:

$$f_i = \frac{f_{i,raw} - \bar{f}_i}{\sigma_{f_i}},\ i = 1, \ldots, F \tag{81}$$

where $f_{i,raw}$ denotes the ith feature of the set, $f_i$ denotes the normalized ith feature, $\bar{f}_i$ denotes a global mean of the ith feature across the training database, and $\sigma_{f_i}$ is the global variance of the ith feature across the training database.

The LogReg model used by the UNCLR classifier 111 takes the real-valued features as an input vector and makes a prediction as to the probability of the input belonging to an uncorrelated class (class 0), indicative of uncorrelated stereo content (UNCLR). For that purpose, the UNCLR classifier 111 comprises a score calculator (not shown) performing a sub-operation (not shown) of calculating a score representative of uncorrelated stereo contents in the input stereo sound signal 190. The score calculator (not shown) computes the output of the LogReg model, which is real-valued, in the form of a linear regression of the extracted features which can be expressed using the following relation:

$$y_p = b_0 + b_1 f_1 + \ldots + b_F f_F \tag{82}$$

where $b_i$ denotes coefficients of the LogReg model, and $f_i$ denotes the individual features. The real-valued output $y_p$ is then transformed into a probability using, for example, the following logistic function:

$$p = (\text{class} = 0) = \frac{1}{1 + e^{-y_p}} \tag{83}$$

The probability, p (class=0), takes a real value between 0 and 1. Intuitively, probabilities closer to 1 mean that the current frame is highly stereo uncorrelated, i.e. having uncorrelated stereo content.

The objective of the learning process is to find the best values for the coefficients $b_i$, i=1, . . . , F based on the training data. The coefficients are found iteratively by minimizing the difference between the predicted output, p(class=0), and the true output, y, on the training database. The UNCLR classifier 111 in the LRTD stereo mode is trained using the Stochastic Gradient Descent (SGD) iterative method as described, for example, in Reference [10], of which the full content is incorporated herein by reference.

By comparing the probabilistic output p(class=0) with a fixed threshold, for example 0.5, it is possible to make a binary classification. However, for the purpose of the UNCLR classification in the LRTD stereo mode, the probabilistic output p(class=0) is not used. Instead, the raw output of the LogReg model, $y_p$, is processed further as shown below.

Figure 5:
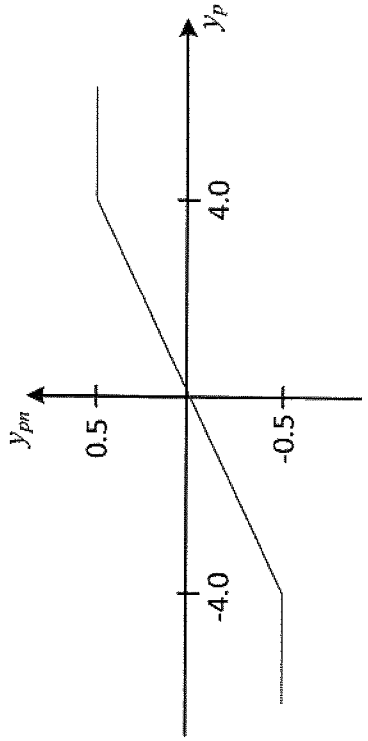
FIG. 5 is a graph illustrating a normalization function applied to an output of a LogReg model in the classification of uncorrelated stereo content in a LRTD stereo mode.

The score calculator (not shown) of the UNCLR classifier 111 first normalizes the raw output of the LogReg model, $y_p$, using, for example, the function as shown in FIG. 5. FIG. 5 is a graph illustrating the normalization function applied to the raw output of the LogReg model in the UNCLR classification in the LRTD stereo mode.

The normalization function of FIG. 5 can be mathematically described as follows:

$$y_{pn}(n) = \begin{cases} 0.5 & \text{if } y_p(n) \geq 4.0 \\ 0.125 y_p(n) & \text{if } -4.0 < y_p(n) < 4.0 \\ -0.5 & \text{if } y_p(n) \leq -4.0 \end{cases} \tag{84}$$

7.1.1 LogReg Output Weighting Based on Relative Frame Energy

The score calculator (not shown) of the UNCLR classifier 111 then weights the normalized output of the LogReg model $y_{pn}(n)$ with the relative frame energy using, for example, the following relation:

$$scr_{UNCLR}(n) = y_{pn}(n) \cdot E_{rl}(n) \tag{85}$$

where $E_{rl}(n)$ is the relative frame energy described by Relation (69). The normalized weighted output $scr_{UNCLR}(n)$ of the LogReg model is called the above mentioned "score" representative or uncorrelated stereo contents in the input stereo sound signal 190.

7.1.2 Rising Edge Detection

The score $scr_{UNCLR}(n)$ still cannot be used directly by the UNCLR classifier 111 for UNCLR classification as it contains occasional short-term "peaks" resulting from imperfect statistical model. These peaks can be filtered out by a simple averaging filter such as first order IIR filter. Unfortunately, the application of such averaging filter usually results in smearing of the rising edges representing transitions between stereo correlated and uncorrelated content in the input stereo sound signal 190. To preserve the rising edges, the smoothing process (application of the averaging IIR filter) is reduced or even stopped when a rising edge is detected in the input stereo sound signal 190. The detection of rising edges in the input stereo sound signal 190 is done by analyzing the evolution of the relative frame energy $E_{rl}(n)$.

The rising edges of the relative frame energy $E_{rl}(n)$ are found by filtering the relative frame energy with a cascade of P=20 identical first-order Resistor-Capacitor (RC) filters each of which having, for example, the following form:

$$F_p(z) = \frac{b_1 z^{-1}}{a_0 + a_1 z^{-1}},\ p = 1, \ldots, 20 \tag{86}$$

The constants $a_0$, $a_1$ and $b_1$ are chosen such that $$\frac{-a_1}{a_0} = \tau_{edge},\ \frac{b_1}{a_0} = 1 - \tau_{edge} \tag{87}$$

Thus, a single parameter $\tau_{edge}$ is used to control the time constant of each RC filter. Experimentally, it was found that good results are achieved with $\tau_{edge}$=0.3. The filtering of the relative frame energy $E_{rl}(n)$ with the cascade of P=20 RC filters can be performed as follows:

$$E_f^{[0]}(n) = t_{edge} \cdot E_f^{[0]}(n-1) + (1 - t_{edge}) \cdot E_{rl}(n) \quad (88)$$
$$E_f^{[1]}(n) = t_{edge} \cdot E_f^{[1]}(n-1) + (1 - t_{edge}) \cdot E_f^{[0]}(n)$$
$$\ldots$$
$$E_f^{[p]}(n) = t_{edge} \cdot E_f^{[p]}(n-1) + (1 - t_{edge}) \cdot E_f^{[p-1]}(n)$$

where the superscript p=0, 1, . . . , P−1 has been added to denote the stage in the RC filter cascade. The output of the cascade of RC filters is equal to the output from the last stage, i.e.

$$E_f(n)=E_f^{[P-1]}(n)=E_f^{[19]}(n) \quad (89)$$

The reason for using a cascade of first-order RC filters instead of a single higher-order RC filter is to reduce the computational complexity. The cascade of multiple first-order RC filters acts as a low-pass filter with a relatively sharp step function. When used on the relative frame energy $E_{rl}(n)$ it tends to smear out occasional short-term spikes while preserving slower but important transitions such as onsets and offsets. The rising edges of the relative frame energy $E_{rl}(n)$ can be quantified by calculating the difference between the relative frame energy and the filtered output using, for example, the following relation:

$$f_{edge}(n)=0.95-0.05(E_{rl}(n)-E_f(n)) \quad (90)$$

The term $f_{edge}(n)$ is limited to the interval <0.9; 0.95>. The score calculator (not shown) of the UNCLR classifier 111 smoothes the normalized weighted output $scr_{UNCLR}(n)$ of the LogReg model with an IIR filter using $f_{edge}(n)$ as forgetting factor using, for example, the following relation to produce a normalized, weighted and smoothed score (output of the LogReg model):

$$wscr_{UNCLR}(n)=f_{edge}(n)\cdot wscr_{UNCLR}(n-1)+(1-f_{edge}(n))\cdot scr_{UNCLR}(n) \quad (91)$$

7.2 UNCLR Classification in the DFT Stereo Mode

In the DFT stereo mode, the method 150 for coding the stereo sound signal 190 comprises an operation 163 of classification of uncorrelated stereo content (UNCLR). To perform operation 163, the device 100 for coding the stereo sound signal 190 comprises a UNCLR classifier 113.

The UNCLR classification in the DFT stereo mode is done similarly as the UNCLR classification in the LRTD stereo mode as described above. Specifically, the UNCLR classification in the DFT stereo mode is also based on the Logistic Regression (LogReg) model. For simplicity, the symbols/names denoting certain parameters and the associated mathematical symbols from the UNCLR classification in the LRTD stereo mode are also used for the DFT stereo mode. Subscripts are added to avoid ambiguity when making reference to the same parameter from multiple sections simultaneously.

The following features extracted by running the device 100 for coding the stereo sound signal (stereo codec) on both the stereo uncorrelated and stereo correlated training databases are used by the UNCLR classifier 113 for UNCLR classification in the DFT stereo mode:

- the ILD gain, $g_{ILD}$ (Relation (43));
- the IPD gain, $g_{IPD}$ (Relation (48));
- the IPD rotation angle, $\varphi_{rot}$ (Relation (49));
- the prediction gain, $g_{pred}$ (Relation (52));
- the mean energy of the inter-channel coherence, $E_{coh}$ (Relation (55));
- the ratio of maximum and minimum intra-channel amplitude products, $r_{PP}$ (Relation (57));
- the overall cross-channel spectral magnitude, $f_X$ (Relation (41)); and
- the maximum value of the GCC-PHAT function, $G_{ITD}$ (Relation (61)).

In total, the UNCLR classifier 113 uses a number F=8 of features.

Before the training process, the UNCLR classifier 113 comprises a normalizer (not shown) performing a sub-operation (not shown) of normalizing the set of features by removing its mean and scaling it to unit variance. The normalizer (not shown) uses, for that purpose, for example the following relation:

$$f_i = \frac{f_{i,raw} - \overline{f}_i}{\sigma_{f_i}}, \; i = 1, \ldots, F \quad (92)$$

where $f_{i,raw}$ denotes the ith feature of the set, $\overline{f}_i$ denotes the global mean of the ith feature across the entire training database and $\sigma_{f_i}$ is the global variance of the ith feature again across the entire training database. It should be noted that the global mean $\overline{f}_i$ and the global variance $\sigma_{f_i}$ used in Relation (92) are different from the same parameters used in Relation (81).

The LogReg model used in the DFT stereo mode is similar to the LogReg model used in the LRTD stereo mode. The output of the LogReg model, $y_p$, is described by Relation (82) and the probability that the current frame has uncorrelated stereo content (class=0) is given by Relation (83). The classifier training process and the procedure to find the optimal decision threshold are described herein above. Again, for that purpose, the UNCLR classifier 113 comprises a score calculator (not shown) performing a sub-operation (not shown) of calculating a score representative of uncorrelated stereo contents in the input stereo sound signal 190.

The score calculator (not shown) of the UNCLR classifier 113 first normalizes the raw output of the LogReg model, $y_p$, similarly as in the LRTD stereo mode and according to the function as illustrated FIG. 5. The normalization can be mathematically described as follows:

$$y_{pn}(n) = \begin{cases} 0.5 & \text{if } y_p(n) \geq 4.0 \\ 0.125 y_p(n) & \text{if } -4.0 < y_p(n) < 4.0 \\ -0.5 & \text{if } y_p(n) \leq -4.0 \end{cases} \quad (93)$$

7.2.1 LogReg Output Weighting Based on Relative Frame Energy

The score calculator (not shown) of the UNCLR classifier 113 then weights the normalized output of the LogReg model, $y_{pn}(n)$, with the relative frame energy $E_{rl}(n)$ using, for example, the following relation:

$$scr_{UNCLR}(n)=y_{pn}(n)\cdot E_{rl}(n) \quad (94)$$

where $E_{rl}(n)$ is the relative frame energy described by Relation (69).

The weighted normalized output of the LogReg model is called the “score” and it represents the same quantity as in the LRTD stereo mode described above. In the DFT stereo mode, the score $scr_{UNCLR}(n)$ is reset to 0 when the alternative VAD flag, $f_{xVAD}(n)$ (Relation (77)), is set to 0. This is expressed by the following relation:

$$scr_{UNCLR}(n)=0, \text{ if } f_{xVAD}(n)=0 \quad (95)$$

7.2.2 Rising Edge Detection in DFT Stereo Mode

The score calculator (not shown) of the UNCLR classifier 113 finally smoothes the score $scr_{UNCLR}(n)$ in the DFT stereo mode with an IIR filter using the rising edge detection mechanism described above in the UNCLR classification in the LRTD stereo mode. For that purpose, the UNCLR classifier 113 uses the relation:

$$wscr_{UNCLR}(n)=f_{edge}(n)\cdot wscr_{UNCLR}(n-1)+(1-f_{edge}(n))\cdot scr_{UNCLR}(n) \quad (96)$$

which is the same as Relation (91).

7.3 Binary UNCLR Decision

The final output of the UNCLR classifier 111/113 is a binary state. Let $c_{UNCLR}(n)$ denote the binary state of the UNCLR classifier 111/113. The binary state $c_{UNCLR}(n)$ has a value "1" to indicate an uncorrelated stereo content class or a value "0" to indicate a correlated stereo content class. The binary state at the output of the UNCLR classifier 111/113 is variable. It is initialized to "0". The state of the UNCLR classifier 111/113 changes from a current class to the other class in frames where certain conditions are met.

Figure 6:
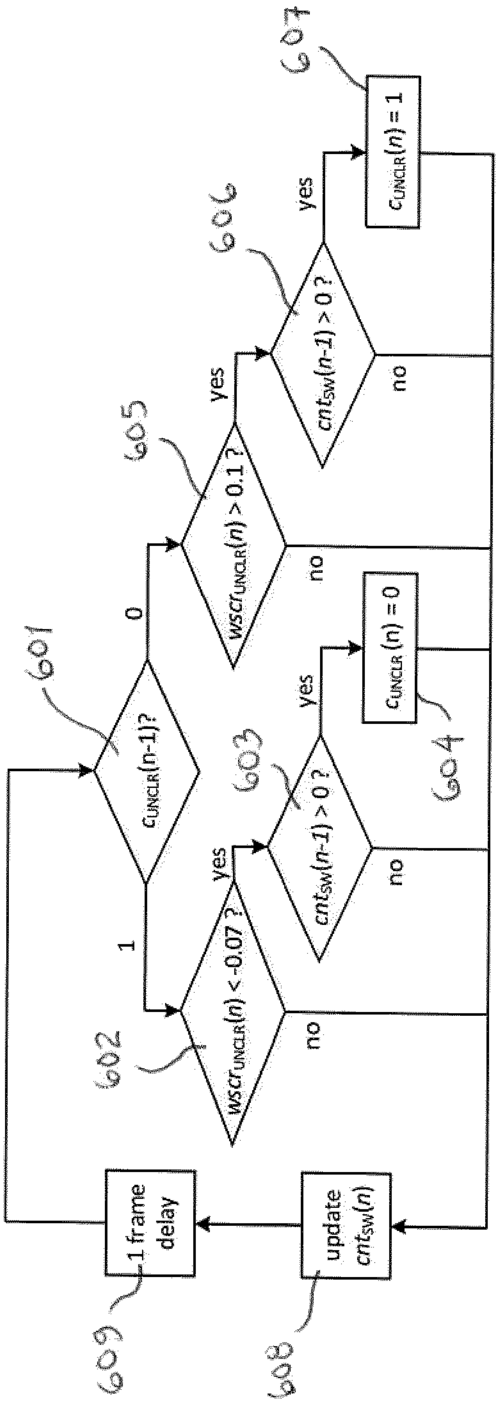
FIG. 6 is a state machine diagram showing a mechanism of switching between stereo content classes in a classifier of uncorrelated stereo content forming part of the device of FIG. 1 for coding a stereo sound signal.

The mechanism used in the UNCLR classifier 111/113 for switching between the stereo content classes is depicted in FIG. 6 in the form of a state machine.

Referring to FIG. 6:

- if (a) the binary state $c_{UNCLR}(n-1)$ of the previous frame is "1" (601), (b) the smoothed score $wscr_{UNCLR}(n)$ of the current frame is smaller than "−0.07" (602), and (c) a variable $cnt_{sw}(n-1)$ of the previous frame is larger than "0" (603), the binary state $c_{UNCLR}(n)$ of the current frame is switched to "0" (604);
- if (a) the binary state $c_{UNCLR}(n-1)$ of the previous frame is "1" (601), and (b) the smoothed score $wscr_{UNCLR}(n)$ of the current frame is not smaller than "−0.07" (602), there is no switching of the binary state $c_{UNCLR}(n)$ in the current frame;
- if (a) the binary state $c_{UNCLR}(n-1)$ of the previous frame is "1" (601), (b) the smoothed score $wscr_{UNCLR}(n)$ of the current frame is smaller than "−0.07" (602), and (c) the variable $cnt_{sw}(n-1)$ of the previous frame is not larger than "0" (603), there is no switching of the binary state $c_{UNCLR}(n)$ in the current frame.

In the same manner, referring to FIG. 6:

- if (a) the binary state $c_{UNCLR}(n-1)$ of the previous frame is "0" (601), (b) the smoothed score $wscr_{UNCLR}(n)$ of the current frame is larger than "0.1" (605), and (c) the variable $cnt_{sw}(n-1)$ of the previous frame is larger than "0" (606), the binary state $c_{UNCLR}(n)$ of the current frame is switched to "1" (607);
- if (a) the binary state $c_{UNCLR}(n-1)$ of the previous frame is "0" (601), and (b) the smoothed score $wscr_{UNCLR}(n)$ of the current frame is not larger than "0.1" (605), there is no switching of the binary state $c_{UNCLR}(n)$ in the current frame;
- if (a) the binary state $c_{UNCLR}(n-1)$ of the previous frame is "0" (601), (b) the smoothed score $wscr_{UNCLR}(n)$ of the current frame is larger than "0.1" (605), and (c) the variable $cnt_{sw}(n-1)$ of the previous frame is not larger than "0" (606), there is no switching of the binary state $c_{UNCLR}(n)$ in the current frame.

Finally, the variable $cnt_{sw}(n)$ in the current frame is updated (608) and the procedure is repeated for the next frame (609).

The variable $cnt_{sw}(n)$ is a counter of frames of the UNCLR classifier 111/113 in which it is possible to switch between LRTD and DFT stereo modes. This counter is initialized to zero and is updated (608) in each frame using, for example, the following logic:

$$cnt_m(n) = \begin{cases} cnt_m(n)+1, & \text{if } c_{type} \in (\text{GENERIC, UNVOICED, INACTIVE}) \\ cnt_m(n)+1, & \text{if } VAD=0 \\ 0, & \text{otherwise} \end{cases} \quad (97)$$

The counter $cnt_{sw}(n)$ has an upper limit of 100. The variable $c_{type}$ indicates the type of the current frame in the device 100 for coding a stereo sound signal. The frame type is usually determined in the pre-processing operation of the device 100 for coding a stereo sound signal (stereo sound codec), specifically in pre-processor(s) 103/104/109. The type of the current frame is usually selected based on the following characteristics of the input stereo sound signal 190:

Pitch period
Voicing
Spectral tilt
Zero-crossing rate
Frame energy difference (short-term, long-term)

As a non-limitative example, the frame type from the 3GPP EVS codec as described in Reference [1] can be used in the UNCLR classifier 111/113 as the parameter $c_{type}$ of Relation (97). The frame type in the 3GPP EVS codec is selected from the following set of classes:

$$c_{type} \in (\text{INACTIVE,UNVOICED,VOICED,GENERIC,TRANSITION,AUDIO})$$

The parameter VAD0 in Relation (97) is the VAD flag without any hangover addition. The VAD flag without hangover addition is often calculated in the pre-processing operation of the device 100 for coding a stereo sound signal (stereo sound codec), specifically in TD pre-processor(s) 103/104/109. As a non-limitative example, the VAD flag without hangover addition from the 3GPP EVS codec as described in Reference [1] may be used in the UNCLR classifier 111/113 as the parameter VAD0.

The output binary state $c_{UNCLR}(n)$ of the UNCLR classifier 111/113 can be altered if the type of the current frame is GENERIC, UNVOICED or INACTIVE or if the VAD flag without hangover addition indicates inactivity (VAD0=0) in the input stereo sound signal. Such frames are generally suitable for switching between the LRTD and DFT stereo modes as they are located either in stable segments or in segments with perceptually low impact on the quality. An objective is to minimize the risk of switching artifacts.

8. DETECTION OF CROSS-TALK (XTALK)

The XTALK detection is based on the LogReg model trained individually for the LRTD stereo mode and for the DFT stereo mode. Both statistical models are trained on features collected from a large database of real stereo recordings and artificially-prepared stereo samples. In the training database each frame is labeled either as single-talk or cross-talk. The labeling is done either manually in case of real stereo recordings or semi-automatically in case of artificially-prepared samples. The manual labeling is made by identifying short compact segments with cross-talk characteristics. The semi-automatic labeling is made using VAD outputs from mono signals before their mixing into stereo signals. Details are provided at the end of the present section 8.

Figure 7:
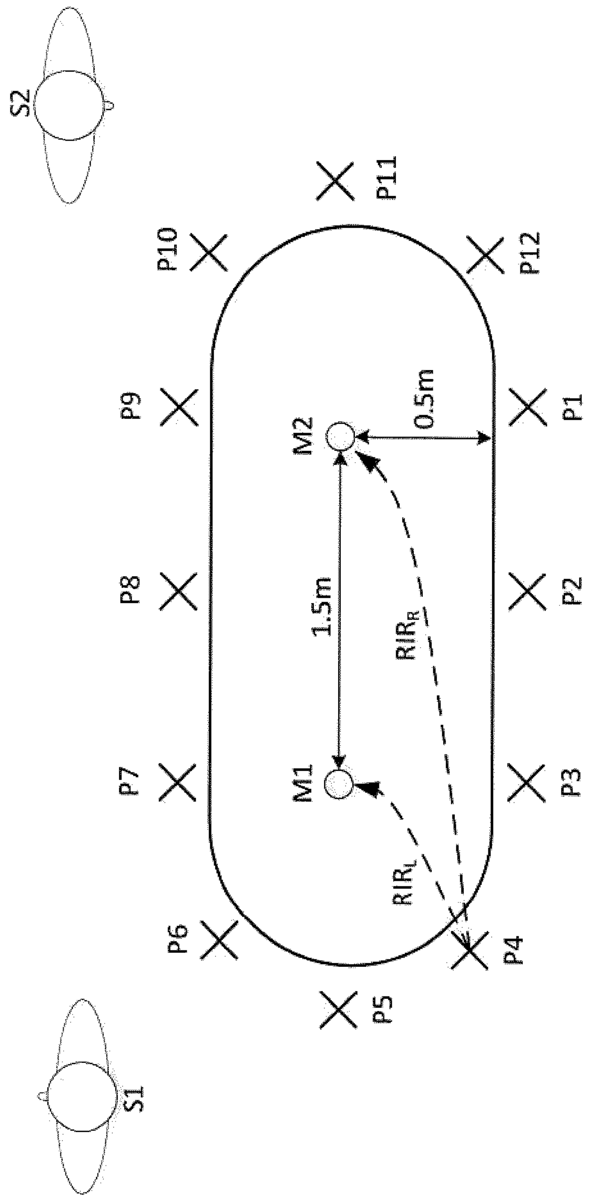
FIG. 7 is a schematic plan view of a large conference room with an AB microphones set-up of which the conditions are simulated for cross-talk detection, wherein AB microphones consist of a pair of cardioid or omnidirectional microphones placed apart in such a way that they cover the space without creating phase issues for each other.

In the non-limitative example of implementation described in the present disclosure, the real stereo recordings are sampled at 32 kHz. The total size of these real stereo recordings is approximately 263 MB corresponding to approximately 30 minutes. The artificially-prepared stereo samples are created by mixing randomly selected speakers from mono clean speech database using the ITU-T G.191 reverberation tool. The artificially-prepared stereo samples are prepared by simulating the conditions in a large conference room with an AB microphones set-up as illustrated in FIG. 7. FIG. 7 is a schematic plan view of the large conference room with the AB microphones set-up of which the conditions are simulated for XTALK detection.

Two types of room are considered, echoic (LEAB) and anechoic (LAAB). Referring to FIG. 7, for each type of room, a first speaker S1 may appear at positions P4, P5 or P6 and a second speaker S2 may appear at positions P10, P11 and P12. The position of each speaker S1 and S2 is selected randomly during the preparation of training samples. Thus, speaker S1 is always close to the first simulated microphone M1 and speaker 2 is always close to the second simulated microphone M2. The microphones M1 and M2 are omnidirectional in the illustrated, non-limitative implementation of FIG. 7. The pair of microphones M1 and M2 constitutes a simulated AB microphones set-up. The mono samples are selected randomly from the training database, down-sampled to 32 kHz and normalized to −26 dBov (dB(overload)—the amplitude of an audio signal compared with the maximum which a device can handle before clipping occurs) before further processing. The ITU-T G.191 reverberation tool contains a database of real measurements of the Room Impulse Response (RIR) for each speaker/microphone pair.

The randomly selected mono samples for speakers S1 and S2 are then convolved with the Room Impulse Responses (RIRs) corresponding to a given speaker/microphone position, thereby simulating a real AB microphone capture. Contributions from both speakers S1 and S2 in each microphone M1 and M2 are added together. A randomly selected offset in the range of 4-4.5 seconds is added to one of the speaker samples before convolution. This ensures that there is always some period of single-talk speech followed by a short period of cross-talk speech and another period of single-talk speech in all training sentences. After RIR convolution and mixing, the samples are again normalized to −26 dBov, this time applied to the passive mono down-mix.

Figure 8:
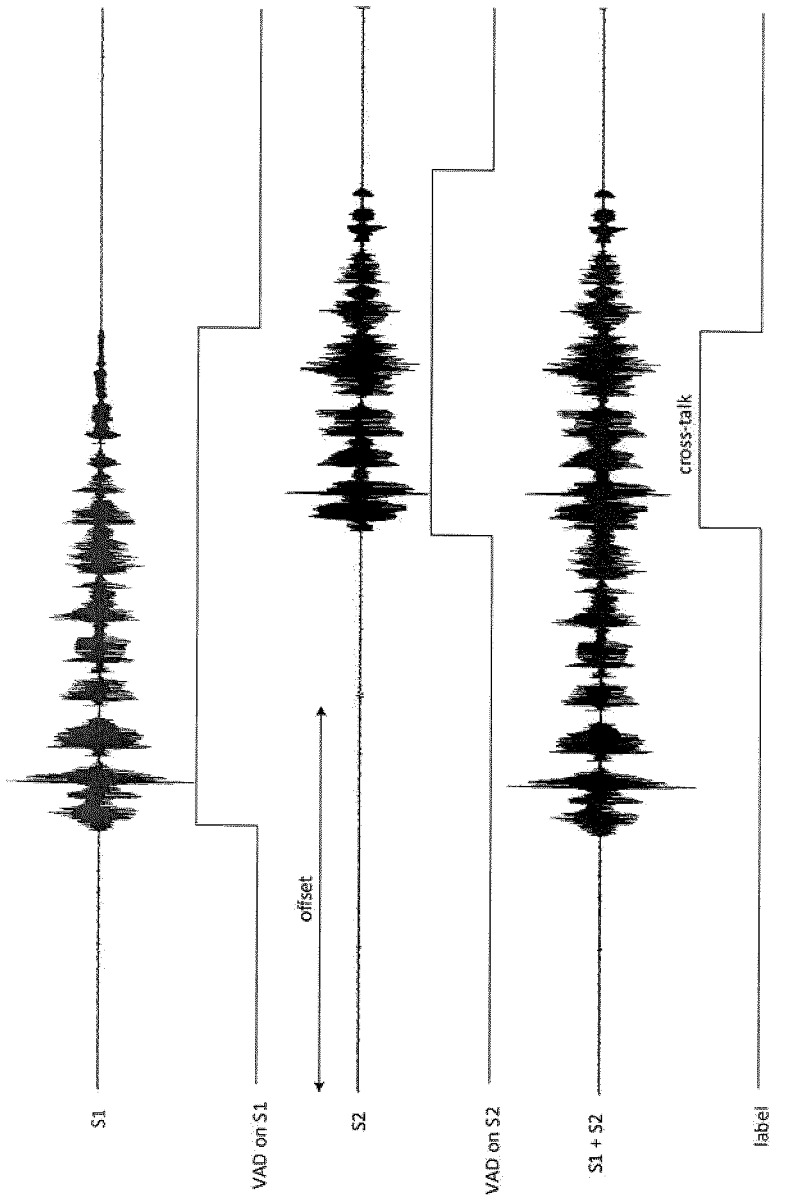
FIG. 8 is a graph illustrating automatic labeling of cross-talk samples using VAD (Voice Activity Detection)

The labels are created semi-automatically using a conventional VAD algorithm, for example the VAD algorithm of the 3GPP EVS codec as described in Reference [1]. The VAD algorithm is applied on the first speaker (S1) file and the second speaker (S2) file individually. Both binary VAD decisions are then combined by means of a logical "AND". This results in the label file. The segments where the combined output is equal to "1" determine the cross-talk segments. This is illustrated in FIG. 8, showing a graph illustrating automatic labeling of cross-talk samples using VAD. In FIG. 8, the first line shows a speech sample from speaker S1, the second line the binary VAD decision on the speech sample from speaker S1, the third line a speech sample from speaker S2, the fourth line the binary VAD decision on the speech sample from speaker S2, and the fifth line the location of the cross-talk segment.

The training set is unbalanced. The proportion of cross-talk frames to single-talk frames is approximately 1 to 5, i.e. only about 21% of the training data belong to the cross-talk class. This is compensated during the LogReg training process by applying class weights as described in Reference [6] of which the full content is incorporated herein by reference.

The training samples are concatenated and used as an input to the device 100 for coding a stereo sound signal (stereo sound codec). The features are collected individually in separate files during the encoding process for each 20 ms frame. This constitutes the training feature set. Let the total number of frames in the training feature set be denoted, for example, as:

$$N_T = N_{XTALK} + N_{NORMAL} \quad (98)$$

where $N_{XTALK}$ is the total number of cross-talk frames and $N_{NORMAL}$ the total number of single-talk frames.

Also, let the corresponding binary label be denoted, for example, as:

$$y(i) = \begin{cases} 1 & , i \in \Omega_{XTALK} \\ 0 & , i \in \Omega_{NORMAL} \end{cases} \quad (99)$$

where $\Omega_{XTALK}$ is the superset of all cross-talk frames and $\Omega_{NORMAL}$ is the superset of all single-talk frames. The inactive frames (VAD=0) are removed from the training database.

8.1 XTALK Detection in the LRTD Stereo Mode

In the LRTD stereo mode, the method 150 for coding the stereo sound signal comprises an operation 160 of detecting cross-talk (XTALK). To perform operation 160, the device 100 for coding the stereo sound signal comprises a XTALK detector 110.

The operation 160 of detecting cross-talk (XTALK) in LRTD stereo mode is done similarly to the UNCLR classification in the LRTD stereo mode described above. The XTALK detector 110 is based on the Logistic Regression (LogReg) model. For simplicity the names of parameters and the associated mathematical symbols from the UNCLR classification are used also in this section. Subscripts are added to symbols to avoid ambiguity when referring to the same parameter name from different sections.

The following features are used by the XTALK detector 110:

- L/R class difference, $d_{class}$ (Relation (32));
- L/R difference of the maximum autocorrelation, $d_v$ (Relation (25));
- L/R difference of the sum of LSFs, $d_{LSF}$ (Relation (23));
- L/R difference of the residual error energy, $d_{LPC13}$ (Relation (22));
- L/R difference of correlation maps, $d_{cmap}$ (Relation (27));
- L/R difference of noise characteristics, $d_{nchar}$ (Relation (29));
- L/R difference of the non-stationarity, $d_{sta}$ (Relation (26));
- L/R difference of the spectral diversity, $d_{sdiv}$ (Relation (28));
- Un-normalized value of the inter-channel correlation function at lag 0, $p_{LR}$ (Relation (14));
- Side-to-mono energy ratio, $r_{SM}$ (Relation (15));
- Difference between the maximum and the minimum of the dot products between the left channel and the mono signal and between the right channel and the mono signal, $d_{mmLR}$ (Relation (19));
- Zero-lag value of the cross-channel correlation function, $R_0$ (Relation (5));
- Evolution of the inter-channel cross-correlation function, RR (Relation (21));
- Position of the maximum inter-channel cross-correlation function, $k_{max}$ (Relation (11);
- Maximum of the inter-channel correlation function, $R_{max}$ (Relation (10);

Difference between L/M and R/M dot products, $\Delta_{LRM}$ (Relation (20)); and Smoothed ratio of energies of the side signal and the mono signal, $\overline{r_{SM}}(n)$ (Relation (16).

Accordingly, the XTALK detector 110 uses a total number F=17 of features.

Before the training process, the XTALK detector 110 comprises a normalizer (not shown) performing a sub-operation (not shown) of normalizing the set of 17 features $f_i$ by removing its mean and scaling it to unit variance. The normalizer (not shown) uses, for example, the following relation:

$$f_i = \frac{f_{i,raw} - \overline{f_i}}{\sigma_{f_i}},\ i = 1, \ldots, F \tag{100}$$

where $f_{i,raw}$ denotes the ith feature of the set, $\overline{f_i}$ is the global mean of the ith feature across the training database and $\sigma_{f_i}$ is the global variance of the ith feature across the training database. Here, the parameters $\overline{f_i}$ and $\sigma_{f_i}$ used in Relation (100) are different from the same parameters used in Relation (81).

The output $y_p$ of the LogReg model is described by Relation (82) and the probability p(class=0) that the current frame belongs to the cross-talk segment class (class 0) is given by Relation (83). The details of the training process and the procedure to find the optimal decision threshold are provided above in the description of the UNCLR classification in the LRTD stereo mode. As described above, for that purpose, the XTALK detector 110 comprises a score calculator (not shown) performing a sub-operation (not shown) of calculating a score representative of uncorrelated stereo contents in the input stereo sound signal 190.

Figure 9:
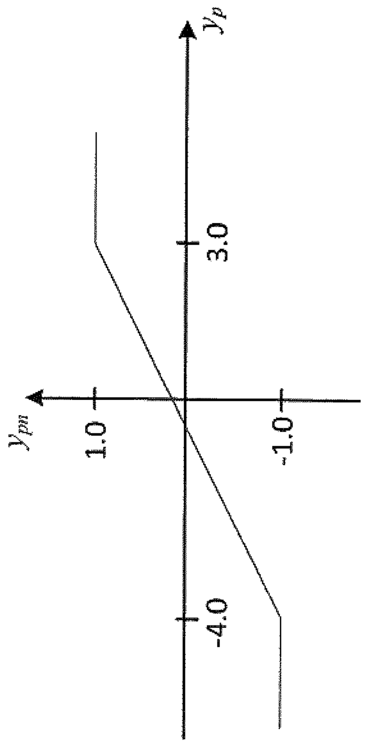
FIG. 9 is a graph representing a function for scaling a raw output of a LogReg model in cross-talk detection in the LRTD stereo mode.

The score calculator (not shown) of the XTALK detector 110 normalizes the raw output of the LogReg model, $y_p$, with the function shown, for example, in FIG. 9 and further processed. FIG. 9 is a graph representing a function for scaling the raw output of the LogReg model in the XTALK detection in the LRTD stereo mode. Such normalization can be mathematically described as follows:

$$y_{pn}(n) = \begin{cases} 1.0 & \text{if } y_p(n) \geq 3.0 \\ 0.333 y_p(n) & \text{if } -3.0 < y_p(n) < 3.0 \\ -1.0 & \text{if } y_p(n) \leq -3.0 \end{cases} \tag{101}$$

The normalized output of the LogReg model, $y_{pn}(n)$, is set to 0 if the previous frame was encoded with the DFT stereo mode and the current frame is encoded with the LRTD stereo mode. Such procedure prevents switching artifacts.

8.1.1 LogReg Output Weighting Based on Relative Frame Energy

The score calculator (not shown) of the XTALK detector 110 weights normalized output of the LogReg model, $y_{pn}(n)$, based on the relative frame energy $E_{rl}(n)$. The weighting scheme applied in the XTALK detector 110 in LRTD stereo mode is similar to the weighting scheme applied in the UNCLR classifier 111 in the LRTD stereo mode, as described herein above. The main difference is that the relative frame energy $E_{rl}(n)$ is not used directly as a multiplicative factor as in Relation (85). Instead, the score calculator (not shown) of the XTALK detector 110 linearly maps the relative frame energy $E_{rl}(n)$ in the interval <0; 0.95> with inverse proportion. This mapping can be done, for example, using the following relation:

$$w_{relE}(n) = -2.375 E_{rl}(n) + 2.1375 \tag{102}$$

Thus, in frames with higher relative energy the weight will be close to 0 whereas in frames with low energy the weight will be close to 0.95. The score calculator (not shown) of the XTALK detector 110 then uses the weight $w_{relE}(n)$ to filter the normalized output of the LogReg model, $y_{pn}(n)$, using for example the following relation:

$$scr_{XTALK}(n) = w_{relE}\, scr_{XTALK}(n-1) + (1 - w_{relE}) y_{pn}(n) \tag{103}$$

where the index n denotes the current frame and n−1 the previous frame.

The normalized weighted output $scr_{XTALK}(n)$ from the XTALK detector 110 is called the "XTALK score" representative of cross-talk in the input stereo sound signal 190.

8.1.2 Rising Edge Detection

In a similar fashion as in the UNCLR classification in the LRTD stereo mode, the score calculator (not shown) of the XTALK detector 110 smoothes the normalized weighted output $scr_{XTALK}(n)$ of the LogReg model. The reason is to smear out occasional short-term "peaks" and "dips" that would otherwise result in false alarms or errors. The smoothing is designed to preserve rising edges of the LogReg output as these rising edges might represent important transitions between the cross-talk and single-talk segments in the input stereo sound signal 190. The mechanism for detection of rising edges in the XTALK detector 110 in LRTD stereo mode is different from the mechanism of detection of rising edges described above in relation to the UNCLR classification in the LRTD stereo mode.

Figure 10:
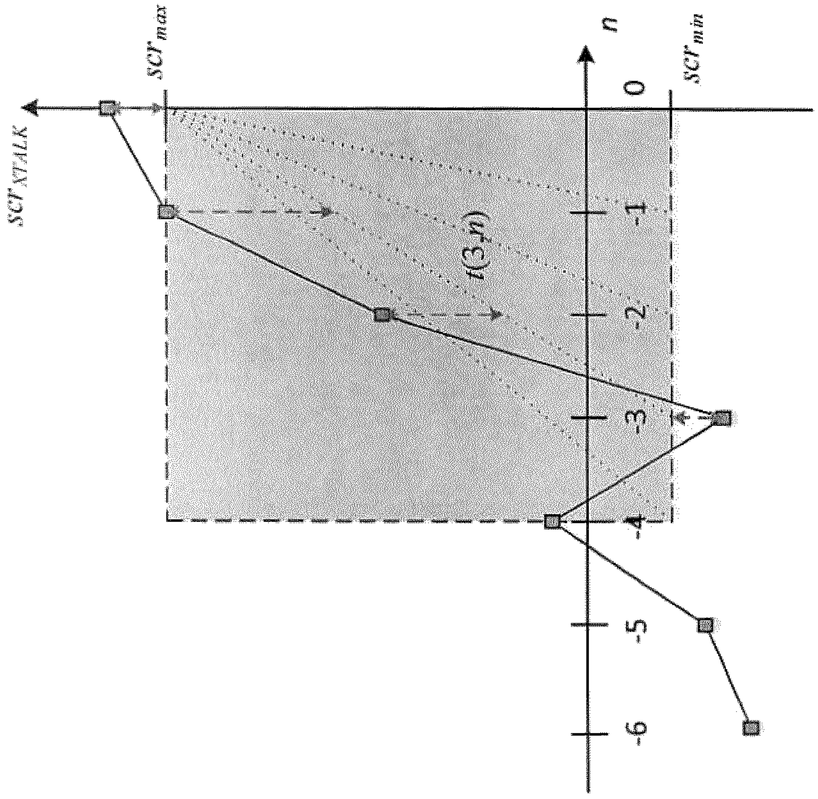
FIG. 10 is a graph illustrating a mechanism of detecting rising edges in a cross-talk detector forming part of the device of FIG. 1 for coding a stereo sound signal in the LRTD stereo mode.

In the XTALK detector 110, the rising edge detection algorithm analyzes the LogReg output values from previous frames and compares them against a set of pre-calculated "ideal" rising edges with different slopes. The "ideal" rising edges are represented as linear functions of the frame index n. FIG. 10 is a graph illustrating the mechanism of detecting rising edges in the XTALK detector 110 in the LRTD stereo mode. Referring to FIG. 10, the x axis contains the indices n of frames preceding the current frame 0. The small grey rectangles are an exemplary output of the XTALK score $scr_{XTALK}(n)$ over a period of six frames preceding the current frame. As can be seen from FIG. 10, there is a rising edge in the XTALK score $scr_{XTALK}(n)$ starting three frames before the current frame. The dotted lines represent the set of four "ideal" rising edges on segments of different lengths.

For each "ideal" rising edge, the rising edge detection algorithm calculates the mean square error between the dotted line and the XTALK score $scr_{XTALK}(n)$. The output of the rising edge detection algorithm is the minimum mean square error among the tested "ideal" rising edges. The linear functions represented by the dotted lines are pre-calculated based on pre-defined thresholds for the minimum and the maximum value, $scr_{min}$ and $scr_{max}$ respectively. This is shown in FIG. 10 by the large, light grey rectangle. The slope of each "ideal" rising edge linear functions depends on the minimum and the maximum thresholds and on the length of the segment.

The rising edge detection is performed by the XTALK detector 110 only in frames meeting the following criterion:

$$\begin{aligned} &\min_{k=0,\ldots,K} (scr_{XTALK}(n-k)) < 0 \text{ AND} \\ &\min_{k=0,\ldots,K} (scr_{XTALK}(n-k)) > 0 \text{ AND} \\ &\min_{k=0,\ldots,K} (scr_{XTALK}(n-k)) - \min_{k=0,\ldots,K} (scr_{XTALK}(n-k)) > 0.2 \end{aligned} \tag{104}$$

where K=4 is the maximum length of the tested rising edges.

Let the output value of the rising edge detection algorithm be denoted $\varepsilon_{0\_1}$. The usage of the "0_1" subscript underlines the fact that the output value of the rising edge detection is limited in the interval <0; 1>. For frames not meeting the criterion in Relation (104), the output value of the rising edge detection is directly set to 0, i.e.

$$\varepsilon_{0\_1}=0 \quad (105)$$

The set of linear functions representing the tested "ideal" rising edges can be mathematically expressed with the following relation:

$$t(l, n-k) = scr_{max} - k\frac{scr_{max} - scr_{min}}{l}, \quad (106)$$
$$l = 1, \ldots , K, k = 1, \ldots , l$$

where the index l denotes the length of the tested rising edge and n−k is the frame index. The slope of each linear function is determined by three parameters, the length of the tested rising edge l, the minimum threshold $scr_{min}$, and the maximum threshold $scr_{max}$. For the purposes of the XTALK detector 110 in the LRTD stereo mode the thresholds are set to $scr_{max}$=1.0 and $scr_{min}$=−0.2. The values of these thresholds were found experimentally.

For each length of the tested rising edge, the rising edge detection algorithm calculates the mean square error between the linear function t (Relation (106)) and the XTALK score $scr_{XTALK}$, using for example the following relation:

$$\varepsilon(l) = \frac{1}{l}\varepsilon_0 + \frac{1}{l}\sum_{k=1}^{l}[scr_{XTALK}(n-k) - t(l, n-k)]^2, l = 1, \ldots , K \quad (107)$$

where $\varepsilon_0$ is the initial error given by:

$$\varepsilon_0=[scr_{XTALK}(n)-scr_{max}]^2 \quad (108)$$

The minimum mean square error is calculated by the XTALK detector 110 using:

$$\varepsilon_{min} = \min_{l=1,\ldots,K}(\varepsilon(;)) \quad (109)$$

The lower the minimum mean square error the stronger the detected rising edge. In a non-limitative implementation, if the minimum mean square error is higher than 0.3 then the output of the rising edge detection is set to 0, i.e.:

$$\varepsilon_{0\_1}=0 \text{ if } \varepsilon_{min}>0.3 \quad (110)$$

and the rising edge detection algorithm quits. In all other cases, the minimum mean square error may be mapped linearly in the interval <0; 1> using, for example, the following relation:

$$\varepsilon_{0\_1}=1-2.5\varepsilon_{min} \quad (111)$$

In the above example, the relationship between the output of the rising edge detection and the minimum mean square error is inversely proportional.

The XTALK detector 110 normalizes the output of the rising edge detection in the interval <0.5; 0.9> to yield an edge sharpness parameter calculated using, for example, the following relation:

$$f_{edge}(n)=0.9-0.4\varepsilon0\_1 \quad (112)$$

with 0.5 and 0.9 used as a lower limit and an upper limit, respectively.

Finally, the score calculator (not shown) of the XTALK detector 110 smoothes the normalized weighted output of the LogReg model, $scr_{XTALK}(n)$, by means of an IIR filter of the XTALK detector 110 with $f_{edge}(n)$ being used in place of the forgetting factor. Such smoothing uses, for example, the following relation:

$$wscr_{XTALK}(n)=f_{edge}(n)\cdot wscr_{XTALK}(n-1)+(1-f_{edge}(n))\cdot scr_{XTALK}(n) \quad (113)$$

The smoothed output $wscr_{XTALK}(n)$ (XTALK score) is reset to 0 in frames where the alternative VAD flag calculated in Relation (77) is zero. That is:

$$wscr_{XTALK}(n)=0, \text{ if } f_{xVAD}(n)=0 \quad (114)$$

8.2 Detection of Cross-Talk in DFT Stereo Mode

In the DFT stereo mode, the method 150 for coding the stereo sound signal 190 comprises an operation 162 of detecting cross-talk (XTALK). To perform operation 162, the device 100 for coding the stereo sound signal 190 comprises a XTALK detector 112.

The XTALK detection in the DFT stereo mode is done similarly as the XTALK detection in the LRTD stereo mode. The Logistic Regression (LogReg) model is used for binary classification of the input feature vector. For simplicity, the names of certain parameters and their associated mathematical symbols from the XTALK detection in the LRTD stereo mode are used also in this section. Subscripts are added to avoid ambiguity when referencing the same parameter from two sections simultaneously.

The following features are extracted from the device 100 for coding the stereo sound signal 190 by running the DFT stereo mode on both the single-talk and cross-talk training databases:

ILD gain, $g_{ILD}$ (Relation (43));

IPD gain, $g_{IPD}$ (Relation (48));

IPD rotation angle, $\varphi_{rot}$ (Relation (49));

Prediction gain, $g_{pred}$ (Relation (52));

Mean energy of the inter-channel coherence, $E_{coh}$ (Relation (55));

Ratio of maximum and minimum intra-channel amplitude products, $r_{PP}$ (Relation (57));

Overall cross-channel spectral magnitude, $f_X$ (Relation (41));

Maximum value of the GCC-PHAT function, $G_{ITD}$ (Relation (61));

Relationship between the amplitudes of the first and the second highest peak of the GCC-PHAT function, $r_{GITD12}$ (Relation (64));

Amplitude of the second highest peak of the GCC-PHAT, $m_{ITD2}$ (Relation (66)); and Difference of the position of the second highest peak in the current frame with respect to the position of the second highest peak in the previous frame, $\Delta_{ITD2}$ (Relation (67)).

In total, the XTALK detector 112 uses a number F=11 of features.

Before the training process, the XTALK detector 112 comprises a normalizer (not shown) performing a sub-operation (not shown) of normalizing the set of extracted features by removing its global mean and scaling it to unit variance using, for example, the following relation:

$$f_i = \frac{f_{1,raw} - \bar{f_i}}{\sigma_{f_i}}, i = 1, \ldots , F \quad (115)$$

where $f_{i,raw}$ denotes the ith feature of the set, $f_i$ denotes the normalized ith feature, $\bar{f}_i$ is the global mean of the ith feature across the training database, and $\sigma_{f_i}$ is the global variance of the ith feature across the training database. The parameters f and $\sigma_{f_i}$ used in Relation (115) are different from those used in Relation (81).

The output of the LogReg model is fully described by Relation (82) and the probability that the current frame belongs to the cross-talk segment class (class 0) is given by Relation (83). The details of the training process and the procedure to find the optimal decision threshold are provided above in the section on UNCLR classification in the LRTD stereo mode. Again, for that purpose, the XTALK detector 112 comprises a score calculator (not shown) performing a sub-operation (not shown) of calculating a score representative of XTALK detection in the input stereo sound signal 190.

The score calculator (not shown) of the XTALK detector 112 normalizes the raw output of the LogReg model, $y_p$, using the function shown in FIG. 5 and further processed. The normalized output of the LogReg model is denoted $y_{pn}$. In the DFT stereo mode, no weighting based on relative frame energy is used. Therefore, the normalized weighted output of the LogReg model, specifically the XTALK score, $scr_{XTALK}(n)$, is given by:

$$scr_{XTALK}(n)=y_{pn} \tag{116}$$

The XTALK score $scr_{XTALK}(n)$ is reset to 0 when the alternative VAD flag $f_{xVAD}(n)$ is set to 0. That can be expressed as follow:

$$scr_{XTALK}(n)=0, \text{ if } f_{xVAD}(n)=0 \tag{117}$$

8.2.1 Rising Edge Detection

As in the case of the XTALK detection in the LRTD stereo mode, the score calculator (not shown) of the XTALK detector 112 smoothes the XTALK score $scr_{XTALK}(n)$ to remove short-term peaks. Such smoothing is performed by means of IIR filtering using the rising edge detection mechanism as described in relation to the XTALK detector 110 in the LRTD stereo mode. The XTALK score $scr_{XTALK}(n)$ is smoothed with an IIR filter using for example the following relation:

$$wscr_{XTALK}(n)=f_{edge}(n)\cdot wscr_{XTALK}(n-1)+(1-f_{edge}(n))\cdot scr_{XTALK}(n) \tag{118}$$

where $f_{edge}(n)$ is the edge sharpness parameter calculated in Relation (112).

8.3 Binary XTALK Decision

The final output of the XTALK detector 110/112 is binary. Let $c_{XTALK}(n)$ denote the output of the XTALK detector 110/112 with "1" representing the cross-talk class and "0" representing the single-talk class. The output $c_{XTALK}(n)$ can also be seen as a state variable. It is initialized to 0. The state variable is changed from the current class to the other only in frames where certain conditions are met. The mechanism for cross-talk class switching is similar to the mechanism of class switching on uncorrelated stereo content which has been described in detail above in Section 7.3. However, there are differences for both the LRTD stereo mode and the DFT stereo mode. These differences will be discussed herein after.

Figure 11:
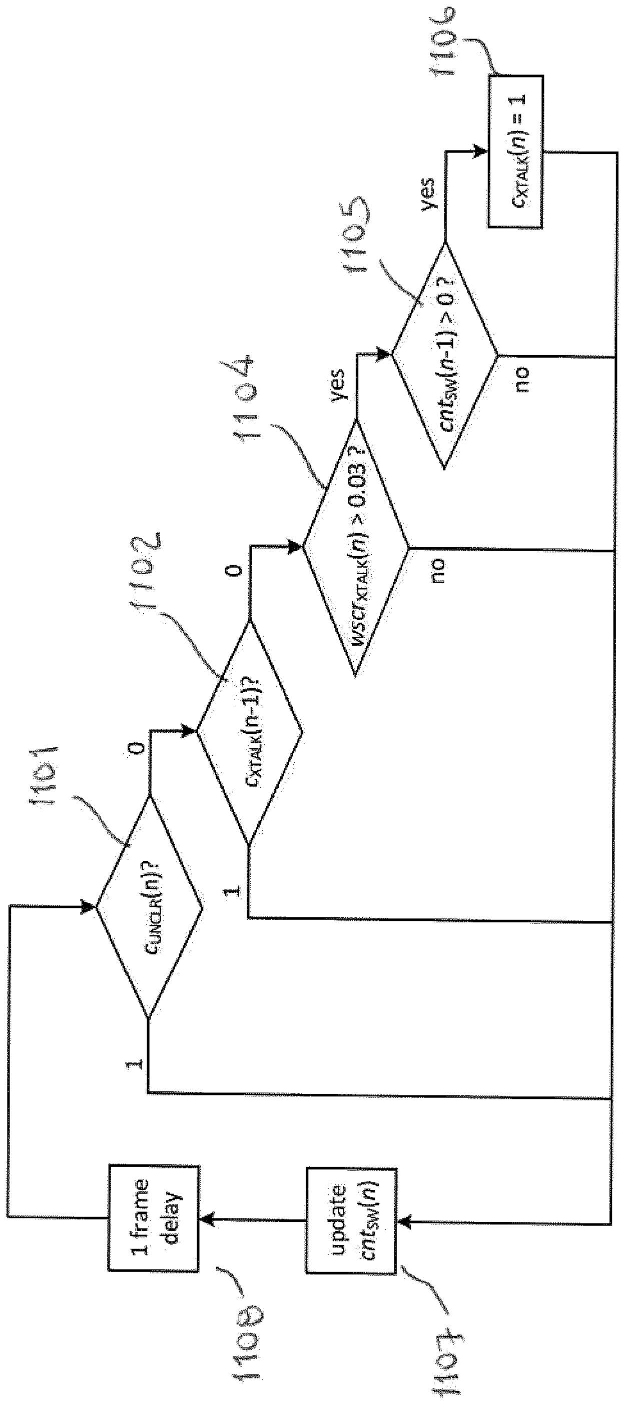
FIG. 11 is a logic diagram illustrating a mechanism of switching between states of an output of the cross-talk detector in the LRTD stereo mode.

In the LRTD stereo mode, the XTALK detector 110 uses the cross-talk switching mechanism as shown in FIG. 11. Referring to FIG. 11:

- If the output $c_{UNCLR}(n)$ of the UNCLR classifier 111 in the current frame n is equal to "1" (1101), there is no switching of the output $c_{XTALK}(n)$ of the XTALK detector 110 in the current frame n.
- If (a) the output $c_{UNCLR}(n)$ of the UNCLR classifier 111 in the current frame n is equal to "0" (1101), and (b) the output $c_{XTALK}(n-1)$ of the XTALK detector 110 in the previous frame n−1 is equal to "1" (1102), there is no switching of the output $c_{XTALK}(n)$ of the XTALK detector 110 in the current frame n.
- If (a) the output $c_{UNCLR}(n)$ of the UNCLR classifier 111 in the current frame n is equal to "0" (1101), (b) the output $c_{XTALK}(n-1)$ of the XTALK detector 110 in the previous frame n−1 is equal to "0" (1102), and (c) the smoothed XTALK score $wscr_{XTALK}(n)$ in the current frame n is not larger than 0.03 (1104), there is no switching of the output $c_{XTALK}(n)$ of the XTALK detector 110 in the current frame n.
- If (a) the output $c_{UNCLR}(n)$ of the UNCLR classifier 111 in the current frame n is equal to "0" (1101), (b) the output $c_{XTALK}(n-1)$ of the XTALK detector 110 in the previous frame n−1 is equal to "0" (1102), (c) the smoothed XTALK score $wscr_{XTALK}(n)$ in the current frame n is larger than 0.03 (1104), and (d) the counter $cnt_{sw}(n-1)$ in the previous frame n−1 is not larger than "0" (1105), there is no switching of the output $c_{XTALK}(n)$ of the XTALK detector 110 in the current frame n.
- If (a) the output $c_{UNCLR}(n)$ of the UNCLR classifier 111 in the current frame n is equal to "0" (1101), (b) the output $c_{XTALK}(n-1)$ of the XTALK detector 110 in the previous frame n−1 is equal to "0" (1102), (c) the smoothed XTALK score $wscr_{XTALK}(n)$ in the current frame n is larger than 0.03 (1104), and (d) the counter $cnt_{sw}(n-1)$ in the previous frame n−1 is larger than "0" (1105), the output $c_{XTALK}(n)$ of the XTALK detector 110 in the current frame n is switched to "1" (1106).

Finally, the counter $cnt_{sw}(n)$ in the current frame n is updated (1107) and the procedure is repeated for the next frame (1108).

The counter $cnt_{sw}(n)$ is common to the UNCLR classifier 111 and the XTALK detector 110 and is defined in Relation (97). A positive value of the counter $cnt_{sw}(n)$ indicates that switching of the state variable $c_{XTALK}(n)$ (output $c_{XTALK}(n)$ of the XTALK detector 110) is allowed. As can be seen in FIG. 11, the switching logic uses the output $c_{UNCLR}(n)$ (1101) of the UNCLR classifier 111 in the current frame. It is therefore assumed that the UNCLR classifier 111 is run before the XTALK detector 110 as it uses its output. Also, the state switching logic of FIG. 11 is unidirectional in the sense that the output $c_{XTALK}(n)$ of the XTALK detector 110 can only be changed from "0" (single-talk) to "1" (cross-talk). The state switching logic for the opposite direction, i.e. from "1" (cross-talk) to "0" (single-talk), is part of the DFT/LRTD stereo mode switching logic which will be described later on in the present disclosure.

In the DFT stereo mode, the XTALK detector 112 comprises an auxiliary parameters calculator (not shown) performing a sub-operation (not shown) of calculating the following auxiliary parameters. Specifically, the cross-talk switching mechanism uses the output $wscr_{XTALK}(n)$ of the XTALK detector 112, and the following auxiliary parameters:

- The Voice Activity Detection (VAD) flag ($f_{VAD}$) in the current frame;
- The amplitudes of the first and second highest peaks of the GCC-PHAT function, $G_{ITD}$, $m_{ITD2}$ (Relations (61) and (66), respectively);

The positions (ITD values) corresponding to the first and second highest peaks of the GCC-PHAT function, $d_{ITD}$, $d_{ITD2}$ as described above); and The DFT stereo silence flag, $f_{sil}$ (Relation (78).

Figure 12:
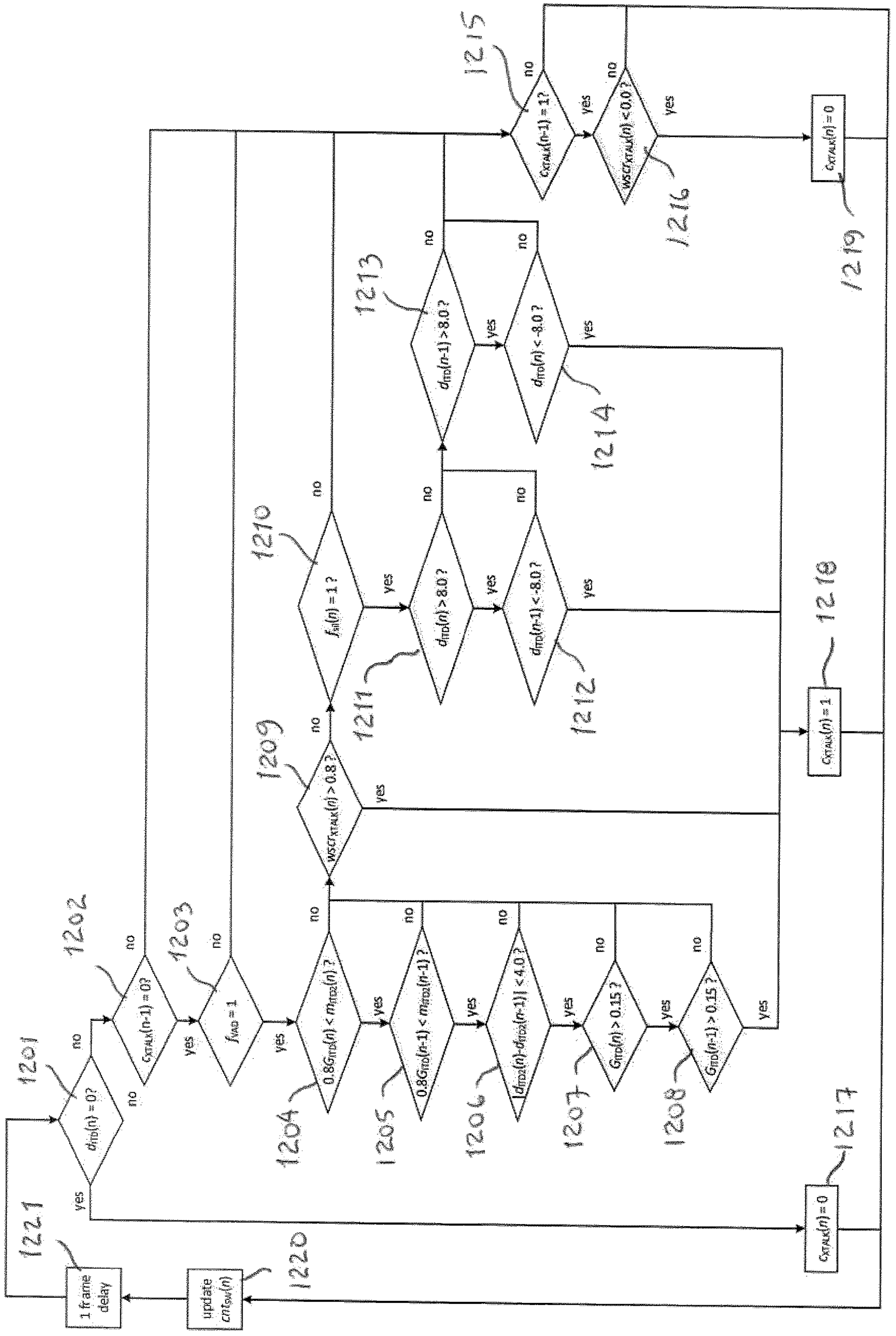
FIG. 12 is a logic diagram illustrating a mechanism of switching between states of an output of the cross-talk detector in a DFT stereo mode.

In the DFT stereo mode, the XTALK detector 112 use the cross-talk switching mechanism as shown in FIG. 12. Referring to FIG. 12:

If $d_{ITD}(n)$ is equal to "0" (1201), $c_{XTALK}(n)$ is switched to "0" (1217);

If (a) $d_{ITD}(n)$ is not equal to "0" (1201), and (b) $c_{XTALK}(n-1)$ is not equal to "0" (1202),
- If (c) $c_{XTALK}(n-1)$ is not equal to "1" (1215), there is no switching of $c_{XTALK}(n)$,
- If (c) $c_{XTALK}(n-1)$ is equal to "1" (1215), and (d) $wscr_{XTALK}(n)$ is not smaller than "0.0" (1216), there is no switching of $c_{XTALK}(n)$;
- If (c) $c_{XTALK}(n-1)$ is equal to "1" (1215), and (d) $wscr_{XTALK}(n)$ is smaller than "0.0" (1216), then $c_{XTALK}(n)$ is switched to "0" (1219);

If (a) $d_{ITD}(n)$ is not equal to "0" (1201), (b) $c_{XTALK}(n-1)$ is equal to "0" (1202), and (c) $f_{VAD}$ is not equal to "1" (1203),
- If (d) $c_{XTALK}(n-1)$ is not equal to "1" (1215), there is no switching of $c_{XTALK}(n)$,
- If (d) $c_{XTALK}(n-1)$ is equal to "1" (1215), and (e) $wscr_{XTALK}(n)$ is not smaller than "0.0" (1216), there is no switching of $c_{XTALK}(n)$;
- If (d) $c_{XTALK}(n-1)$ is equal to "1" (1215), and (e) $wscr_{XTALK}(n)$ is smaller than "0.0" (1216), then $c_{XTALK}(n)$ is switched to "0" (1219);

If (a) $d_{ITD}(n)$ is not equal to "0" (1201), (b) $c_{XTALK}(n-1)$ is equal to "0" (1202), (c) $f_{VAD}$ is equal to "1" (1203), (d) 0.8 $G_{ITD}(n)$ is smaller than $m_{ITD2}(n)$ (1204), (e) 0.8 $G_{ITD}(n-1)$ is smaller that $m_{ITD2}(n-1)$ (1205), (f) $d_{ITD2}(n)-d_{ITD2}(n-1)$ is smaller that "4.0" (1206), (g) $G_{ITD}(n)$ is larger that "0.15" (1207), and (h) $G_{ITD}(n-1)$ is larger than "0.15" (1208), $c_{XTALK}(n)$ is switched to "1" (1218);

If (a) $d_{ITD}(n)$ is not equal to "0" (1201), (b) $c_{XTALK}(n-1)$ is equal to "0" (1202), (c) $f_{VAD}$ is equal to "1" (1203), and (d) any of the tests 1204 to 1208 is negative,
- If (e) $wscr_{XTALK}(n)$ is larger than "0.8" (1209), $c_{XTALK}(n)$ is switched to "1" (1218);

If (a) $d_{ITD}(n)$ is not equal to "0" (1201), (b) $c_{XTALK}(n-1)$ is equal to "0" (1202), (c) $f_{VAD}$ is equal to "1" (1203), (d) any of the tests 1204 to 1208 is negative, (e) $wscr_{XTALK}(n)$ is not larger than "0.8" (1209), and (f)$f_{sil}(n)$ is not equal to "1" (1210),
- If (g) $c_{XTALK}(n-1)$ is not equal to "1" (1215), there is no switching of $c_{XTALK}(n)$,
- If (g) $c_{XTALK}(n-1)$ is equal to "1" (1215), and (h) $wscr_{XTALK}(n)$ is not smaller than "0.0" (1216), there is no switching of $c_{XTALK}(n)$;
- If (g) $c_{XTALK}(n-1)$ is equal to "1" (1215), and (h) $wscr_{XTALK}(n)$ is smaller than "0.0" (1216), then $c_{XTALK}(n)$ is switched to "0" (1219);

If (a) $d_{ITD}(n)$ is not equal to "0" (1201), (b) $c_{XTALK}(n-1)$ is equal to "0" (1202), (c) $f_{VAD}$ is equal to "1" (1203), (d) any of the tests 1204 to 1208 is negative, (e) $wscr_{XTALK}(n)$ is not larger than "0.8" (1209), (f) $f_{sil}(n)$ is equal to "1" (1210), (g) $d_{ITD}(n)$ is larger than "8.0" (1211), and (h) $d_{ITD}(n-1)$ is smaller than "−8.0", then $c_{XTALK}(n)$ is switched to "1" (1218);

If (a) $d_{ITD}(n)$ is not equal to "0" (1201), (b) $c_{XTALK}(n-1)$ is equal to "0" (1202), (c) $f_{VAD}$ is equal to "1" (1203), (d) any of the tests 1204 to 1208 is negative, (e) $wscr_{XTALK}(n)$ is not larger than "0.8" (1209), (f) $f_{sil}(n)$ is equal to "1" (1210), (g) any of the tests 1211 and 1212 is negative, (h) $d_{ITD}(n-1)$ is larger than "8.0" (1213), and (i) $d_{ITD}(n)$ is smaller than "−8.0" (1214), then $c_{XTALK}(n)$ is switched to "1" (1218);

If (a) $d_{ITD}(n)$ is not equal to "0" (1201), (b) $c_{XTALK}(n-1)$ is equal to "0" (1202), (c) $f_{VAD}$ is equal to "1" (1203), (d) any of the tests 1204 to 1208 is negative, (e) $wscr_{XTALK}(n)$ is not larger than "0.8" (1209), (f) $f_{sil}(n)$ is equal to "1" (1210), (g) any of the tests 1211 and 1212 is negative, (h) any of the tests 1213 and 1214 is negative,
- If (i) $c_{XTALK}(n-1)$ is not equal to "1" (1215), there is no switching of $c_{XTALK}(n)$,
- If (i) $c_{XTALK}(n-1)$ is equal to "1" (1215), and (j) $wscr_{XTALK}(n)$ is not smaller than "0.0" (1216), there is no switching of $c_{XTALK}(n)$;
- If (i) $c_{XTALK}(n-1)$ is equal to "1" (1215), and (j) $wscr_{XTALK}(n)$ is smaller than "0.0" (1216), then $c_{XTALK}(n)$ is switched to "0" (1219).

Finally, the counter $cnt_{sw}(n)$ in the current frame n is updated (1220) and the procedure is repeated for the next frame (1221).

The variable $cnt_{sw}(n)$ is the counter of frames where it is possible to switch between the LRTD and the DFT stereo modes. This counter $cnt_{sw}(n)$ is common to the UNCLR classifier 113 and the XTALK detector 112. The counter $cnt_{sw}(n)$ is initialized to zero and updated in each frame according to Relation (97).

9. DFT/LRTD STEREO MODE SELECTION

The method 150 for coding the stereo sound signal 190 comprises an operation 164 of selecting the LRTD or DFT stereo mode. To perform operation 164, the device 100 for coding the stereo sound signal 190 comprises a LRTD/DFT stereo mode selector 114 receiving, delayed by one frame (191), the XTALK decision from the XTALK detector 110, the UNCLR decision from the UNCLR classifier 111, the XTALK decision from the XTALK detector 112, and the UNCLR decision from the UNCLR classifier 113.

The LRTD/DFT stereo mode selector 114 selects the LRTD or DFT stereo mode based on the binary output $c_{UNCLR}(n)$ of the UNCLR classifier 111/113 and the binary output $c_{XTALK}(n)$ of the XTALK detector 110/112. The LRTD/DFT stereo mode selector 114 also takes into account some auxiliary parameters. These parameters are used mainly to prevent stereo mode switching in perceptually sensitive segments or to prevent frequent switching in segments where both the UNCLR classifier 111/113 and the XTALK detector 110/112 do not provide accurate outputs.

The operation 164 of selecting the LRTD or DFT stereo mode is performed before down-mixing and encoding of the input stereo sound signal 190. As a consequence, the operation 164 uses the outputs from the UNCLR classifier 111/113 and the XTALK detector 110/112 from the previous frame, as shown at 191 in FIG. 1. The operation 164 of selecting the LRTD or DFT stereo mode is further described in the schematic block diagram of FIG. 13.

As will be described in the following description, the DFT/LRTD stereo mode selection mechanism used in operation 164 comprises the following sub-operations:

An initial DFT/LRTD stereo mode selection; and

A LRTD to DFT stereo mode switching upon detecting cross-talk content.

9.1 Initial DFT/LRTD Stereo Mode Selection

The DFT stereo mode is the preferred mode for encoding single-talk speech with high inter-channel correlation between the left (L) and right (R) channel of the input stereo sound signal 190.

The LRTD/DFT stereo mode selector 114 starts initial selection of the stereo mode by determining whether the previous, processed frame was "likely a speech frame". This can be done, for example, by examining the log-likelihood ratio between the "speech" class and the "music" class. The log-likelihood ratio is defined as the absolute difference between the log-likelihood of the input stereo sound signal frame being generated by a "music" source and the log-likelihood of the input stereo sound signal frame being generated by a "speech" source. The following relation may be used to calculate the log-likelihood ratio:

$$dL_{SM}(n)=L_M(n)-L_S(n) \tag{119}$$

where $L_S(n)$ is the log-likelihood of the "speech" class and $L_M(n)$ the log-likelihood of the "music" class.

As an example, a Gaussian Mixture Model (GMM) from the 3GPP EVS codec as described in Reference [7], of which the full content is incorporated herein by reference, can be used for estimating the log-likelihood of the "speech" class, $L_S(n)$, and the log-likelihood of the "music" class, $L_M(n)$. Other methods of speech/music classification can also be used to calculate the log-likelihood ratio (differential score) $dL_{SM}(n)$.

The log-likelihood ratio $dL_{SM}(n)$ is smoothed with two IIR filters with different forgetting factors using, for example, the following relation:

$$wdL_{SM}^{(1)}(n)=0.97\cdot wdL_{SM}^{(1)}(n-1)+0.03\cdot dL_{SM}(n-1)$$

$$wdL_{SM}^{(2)}(n)=0.995\cdot wdL_{SM}^{(2)}(n-1)+0.005\cdot dL_{SM}(n-1) \tag{120}$$

where the superscript (1) indicates the first IIR filter and the superscript (2) indicates the second IIR filter, respectively.

The smoothed values $wdL_{SM}^{(1)}(n)$ and $wdL_{SM}^{(2)}(n)$ are then compared with predefined thresholds and a new binary flag, $f_{SM}(n)$, is set to 1 if the following combined condition, for example, is met:

$$f_{SM}(n)=\begin{cases}1 & \text{if } wdL_{SM}^{(1)}(n)<1.0 \text{ AND } wdL_{SM}^{(2)}(n)<0.0\\ 0 & \text{otherwise}\end{cases} \tag{121}$$

The flag $f_{SM}(n)=1$ is an indicator that the previous frame was likely a speech frame. The threshold of 1.0 has been found experimentally.

The initial DFT/LRTD stereo mode selection mechanism then sets a new binary flag, $f_{UX}(n)$, to 1 if the binary output $c_{UNCLR}(n-1)$ of the UNCLR classifier 111/113 or the binary output $c_{XTALK}(n-1)$ of the XTALK detector 110/112, in the previous frame n−1, are set to 1, and if the previous frame was likely a speech frame. This can be expressed by the following relation:

$$f_{UX}(n)=\begin{cases}1 & \text{if } f_{SM}(n)=1 \text{ AND } (c_{UNCLR}(n-1)=1 \text{ OR } c_{XTALK}(n-1)=1)\\ 0 & \text{otherwise}\end{cases} \tag{122}$$

Let $M_{SMODE}(n)\in(\text{LRTD},\text{DFT})$ be a discrete variable denoting the selected stereo mode in the current frame n. The stereo mode is initialized in each frame with the value from the previous frame n−1, i.e.:

$$M_{SMODE}(n)=M_{SMODE}(n-1) \tag{123}$$

If the flag $f_{UX}(n)$ is set to 1, then the LRTD stereo mode is selected for encoding in the current frame n. This can be expressed as follows:

$$M_{SMODE}(n)\leftarrow\text{LRTD if } f_{UX}=1 \tag{124}$$

If the flag $f_{UX}(n)$ is set to 0 in the current frame n and the stereo mode in the previous frame n−1 was the LRTD stereo mode, then an auxiliary stereo mode switching flag $f_{TDM}(n-1)$, to be described herein after, from a LRTD energy analysis processor 1301 of the LRTD/DFT stereo mode selector 114 is analyzed to select the stereo mode in the current frame n, using for example the following relation:

$$M_{SMODE}(n)\leftarrow\begin{cases}LRTD & \text{if } f_{SM}(n)=1 \text{ AND } f_{TDM}(n-1)=1\\ DFT & \text{otherwise}\end{cases} \tag{125}$$

The auxiliary stereo mode switching flag $f_{TDM}(n)$ is updated in every frame in the LRTD mode only. The updating of parameter $f_{TDM}(n)$ is described in the following description.

Figure 13:
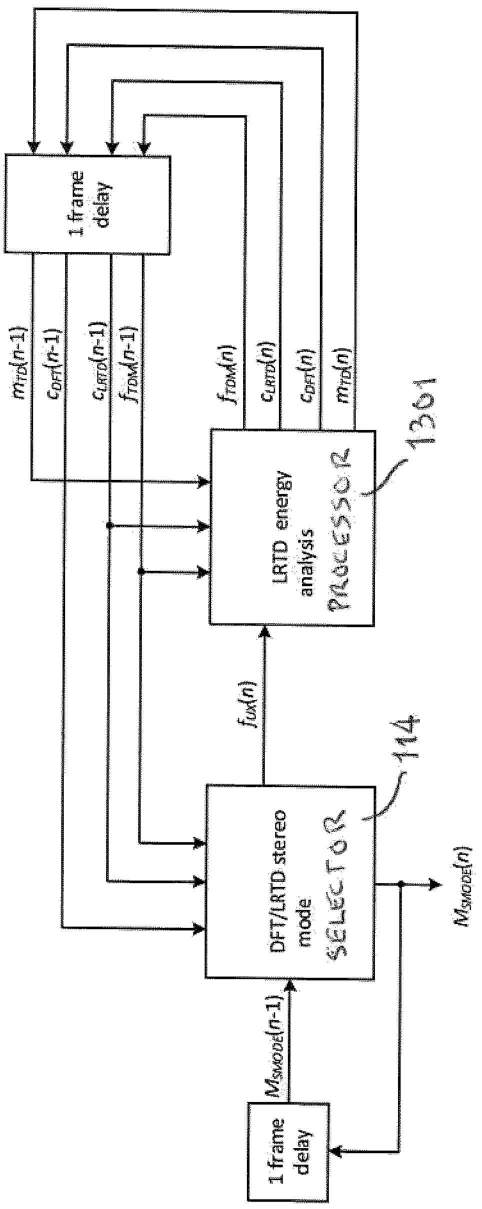
FIG. 13 is a schematic block diagram illustrating a mechanism of selecting between the LRTD and DFT stereo modes.

As shown in FIG. 13, the LRTD/DFT stereo mode selector 114 comprises the LRTD energy analysis processor 1301 to produce the auxiliary parameters $f_{TDM}(n)$, $c_{LRTD}(n)$, $c_{DFT}(n)$, and $m_{TD}(n)$ described in more detail later on in the present disclosure.

If the flag $f_{UX}(n)$ is set to 0 in the current frame n and the stereo mode in the previous frame n−1 was the DFT stereo mode, no stereo mode switching is performed and the DFT stereo mode is selected in the current frame n as well.

9.2 LRTD to DFT Stereo Mode Switching Upon XTALK Detection

The XTALK detector 110 in the LRTD mode has been described in the foregoing description. As can be seen from FIG. 11, the binary output $c_{XTALK}(n)$ of the XTALK detector 110 can only be set to 1 when cross-talk content is detected in the current frame. As a consequence, the initial stereo mode selection logic as described above cannot select the DFT stereo mode when the XTALK detector 110 indicates single-talk content. This could lead to unwanted extension of the LRTD stereo mode in situations when a cross-talk stereo sound signal segment is followed by a single-talk stereo sound signal segment. Therefore, an additional mechanism has been implemented for switching back from the LRTD stereo mode to the DFT stereo mode upon detection of single-talk content. The mechanism is described in the following description.

If the LRTD/DFT stereo mode selector 114 selected the LRTD stereo mode in the previous frame n−1 and the initial stereo mode selection selected the LRTD mode in the current frame n and if, at the same time, the binary output $c_{XTALK}(n-1)$ of the XTALK detector 110 was 1, then the stereo mode may be changed from the LRTD to the DFT stereo mode. The latter change is allowed, for example when the below-listed conditions are fulfilled:

$$M_{SMODE}(n) \leftarrow DFT \text{ if } \begin{bmatrix} M_{SMODE}(n) = LRTD \text{ AND} \\ M_{SMODE}(n-1) = LRTD \text{ AND} \\ c_{XTALK}(n) = 1 \text{ AND} \\ f_{UX}(n-1) = 1 \text{ AND} \\ c_{LRTD}(n-1) > 15 \text{ AND} \\ c_{DFT}(n-1) > 3 \text{ AND} \\ clas(n-1) \in \begin{pmatrix} \text{UNVOICED\_CLAS} \\ \text{UNVOICED\_TRANSITION} \\ \text{VOICED\_TRANSITION} \end{pmatrix} \text{ AND} \\ (brate \geq 16400 \text{ OR } wscr_{XTALK}(n-1) < 0.01) \end{bmatrix} \tag{126}$$

The set of conditions defined above contains references to clas and brate parameters. The brate parameter is a high-level constant containing the total bitrate used by the device 100 for coding a stereo sound signal (stereo codec). It is set during the initialization of the stereo codec and kept unchanged during the encoding process.

The clas parameter is a discrete variable containing the information about the frame type. The clas parameter is usually estimated as part of the signal pre-processing of the stereo codec. As a non-limitative example, the clas parameter from Frame Erasure Concealment (FEC) module of the 3GPP EVS codec as described in Reference [1] can be used in the DFT/LRTD stereo mode selection mechanism. The clas parameter from FEC module of the 3GPP EVS codec is selected with the consideration of the frame erasure concealment and decoder recovery strategy in mind. The clas parameter is selected from the following pre-defined set of classes $$clas \in \begin{pmatrix} \text{UNVOICED\_CLAS, UNVOICED\_TRANSITION,} \\ \text{VOICED\_TRANSITION,} \\ \text{VOICED\_CLAS, ONSET\_CLAS, AUDIO\_CLAS} \end{pmatrix}$$

It is within the scope of the present disclosure to implement the DFT/LRTD stereo mode selection mechanism with other means of frame type classification.

In the set of conditions (126) defined above, the condition $$clas(n-1) \in \begin{pmatrix} \text{UNVOICED\_CLAS} \\ \text{UNVOICED\_TRANSITION} \\ \text{VOICED\_TRANSITION} \end{pmatrix}$$

refers to the clas parameter calculated during pre-processing of the down-mixed mono (M) channel when the device 100 for coding a stereo sound signal runs in the DFT stereo mode.

In case the device 100 for coding a stereo sound signal is in the LRTD stereo mode, the condition shall be replaced with:

$$clas_L(n-1) \in \begin{pmatrix} \text{UNVOICED\_CLAS} \\ \text{UNVOICED\_TRANSITION} \\ \text{VOICED\_TRANSITION} \end{pmatrix} \text{ AND } clas_R(n-1) \in$$

-continued $$\begin{pmatrix} \text{UNVOICED\_CLAS} \\ \text{UNVOICED\_TRANSITION} \\ \text{VOICED\_TRANSITION} \end{pmatrix}$$

where the indices "L" and "R" refer to clas parameter calculated in the preprocessing module of the left (L) channel and the right (R) channel, respectively.

The parameters $c_{LRTD}(n)$ and $c_{DFT}(n)$ are the counters of LRTD and DFT frames, respectively. These counters are updated in every frame as part of the LRTD energy analysis processor 1301. The updating of the two counters $c_{LRTD}(n)$ and $c_{DFT}(n)$ is described in detail in the next section.

9.3 Auxiliary Parameters Calculated in the LRTD Energy Analysis Module

When the device 100 for coding a stereo sound signal is run in the LRTD stereo mode, the LRTD/DFT stereo mode selector 114 calculates or updates several auxiliary parameters to improve the stability of the DFT/LRTD stereo mode selection mechanism.

For certain special types of frames, the LRTD stereo mode runs in the so-called "TD sub-mode". The TD sub-mode is usually applied for short transition periods before switching from the LRTD stereo mode to the DFT stereo mode. Whether or not the LRTD stereo mode will run in the TD sub-mode is indicated by a binary sub-mode flag $m_{TD}(n)$. The binary flag $m_{TD}(n)$ is one of the auxiliary parameters and may be initialized in each frame as follows:

$$m_{TD}(n) = f_{TDM}(n-1) \tag{127}$$

where $f_{TDM}(n)$ is the above mentioned auxiliary switching flag described later on in this section.

The binary sub-mode flag $m_{TD}(n)$ is reset to 0 or 1 in frames where $f_{UX}(n)=1$. The condition for resetting $m_{TD}(n)$ is defined, for example, as follows:

$$\text{if } f_{UX}(n) = 1 \text{ then} \quad m_{TD}(n) \leftarrow \begin{cases} 1 & \text{if } f_{TDM}(n-1) = 1 \text{ OR } M_{SMODE}(n-1) \neq LRTD \text{ OR } c_{LRTD}(n-1) < 5 \\ 0 & \text{otherwise} \end{cases} \tag{128}$$

If $f_{UX}(n)=0$, the binary sub-mode flag $m_{TD}(n)$ is not changed.

The LRTD energy analysis processor 1301 comprises the above-mentioned two counters, $c_{LRTD}(n)$ and $c_{DFT}(n)$. The counter $c_{LRTD}(n)$ is one of the auxiliary parameters and counts the number of consecutive LRTD frames. This counter is set to 0 in every frame where the DFT stereo mode has been selected in the device 100 for coding a stereo sound signal and is incremented by 1 in every frame where LRTD stereo mode has been selected. This can be expressed as follows:

$$c_{LRTD}(n) = \begin{cases} c_{LRTD}(n-1) + 1 & \text{if } f_{UX}(n) = 1 \\ 0 & \text{otherwise} \end{cases} \tag{129}$$

Essentially, the counter $c_{LRTD}(n)$ contains the number of frames since the last DFT→LRTD switching point. The counter $c_{LRTD}(n)$ is limited by a threshold of 100. The counter $c_{DFT}(n)$ counts the number of consecutive DFT frames. The counter $c_{DFT}(n)$ is one of the auxiliary parameters and is set to 0 in every frame where LRTD stereo mode has been selected in the device 100 for coding a stereo sound signal and is incremented by 1 in every frame where the DFT stereo mode has been selected. This can be expressed as follows:

$$c_{DFT}(n) = \begin{cases} c_{DFT}(n-1)+1 & \text{if } f_{TDM}(n)=0 \\ 0 & \text{otherwise} \end{cases} \quad (130)$$

Essentially, the counter $c_{DFT}(n)$ contains the number of frames since the last LRTD→DFT switching point. The counter $c_{DFT}(n)$ is limited by a threshold of 100.

The last auxiliary parameter calculated in the LRTD energy analysis processor 1301 is the auxiliary stereo mode switching flag $f_{TDM}(n)$. This parameter is initialized, in every frame, with the binary flag $f_{UX}(n)$ as follows:

$$f_{TDM}(n)=f_{UX}(n) \quad (131)$$

The auxiliary stereo mode switching flag $f_{TDM}(n)$ is set to 0 when the left (L) and right (R) channel of the input stereo sound signal 190 are out-of-phase (OOP). An exemplary method for OOP detection can be found, for example, in Reference [8] of which the full content is incorporated herein by reference. When an OOP situation is detected, a binary flag s2m is set to 1 in the current frame n, otherwise it is set to zero. The auxiliary stereo mode switching flag $f_{TDM}(n)$ in the LRTD stereo mode is set to zero when the binary flag s2m is set to 1. This can be expressed with Relation (132):

$$f_{TDM}(n) \leftarrow 0 \text{ if } s2m(n)=1 \quad (132)$$

If the binary flag s2m(n) is set to zero, then the auxiliary switching flag $f_{TDM}(n)$ can be reset to zero based, for example, on the following sets of conditions:

$$f_{TDM}(n) \leftarrow 0 \text{ if } \begin{bmatrix} m_{TD}(n)=1 \text{ AND} \\ c_{LRTD}(n)>10 \text{ AND} \\ \begin{bmatrix} VAD=0 \text{ OR} \\ c_{UNCLR}(n)=0 \text{ AND } (scr_{XTALK}(n)<-0.8 \text{ OR} \\ \quad wscr_{XTALK}(n)<-0.13) \text{ OR} \\ c_{UNCLR}(n)=1 \text{ AND } clas(n-1)=\text{UNVOICED\_CLAS AND} \\ \quad |wscr_{UNCLR}(n)|<0.005 \end{bmatrix} \end{bmatrix} \quad (133)$$

Of course, the DFT/LRTD stereo mode switching mechanism can be implemented with other methods for OOP detection.

The auxiliary stereo mode switching flag $f_{TDM}(n)$ can also be reset to 0 based on the following sets of conditions:

$$f_{TDM}(n) \leftarrow 0 \text{ if } \begin{bmatrix} m_{TD}(n)=0 \text{ AND} \\ \begin{bmatrix} VAD=0 \text{ OR} \\ c_{UNCLR}(n)=0 \text{ AND } (scr_{XTALK}(n)\le -0 \text{ OR} \\ \quad wscr_{XTALK}(n)\le 0.1) \text{ OR} \\ c_{UNCLR}(n)=1 \text{ AND } clas(n-1)=\text{UNVOICED\_CLAS AND} \\ \quad |wscr_{UNCLR}(n)|<0.025 \end{bmatrix} \end{bmatrix} \quad (134)$$

In the two sets of conditions as defined above, the condition $$clas(n-1)=\text{UNVOICED\_}CLAS$$

refers to the clas parameter calculated during pre-processing of the down-mixed mono (M) channel when the device 100 for coding a stereo sound signal runs in the DFT stereo mode.

In case the device 100 for coding a stereo sound signal is in the LRTD stereo mode, the condition shall be replaced with:

$$clas_L(n-1)=\text{UNVOICED\_}CLAS \text{ AND } clas_R(n-1)=\text{UNVOICED\_}CLAS$$

where the indices "L" and "R" refer to clas parameter calculated during preprocessing of the left (L) channel and the right (R) channel, respectively.

10. CORE ENCODERS

The method 150 for coding a stereo sound signal comprise an operation 115 of core encoding the left channel (L) of the stereo sound signal 190 in the LRTD stereo mode, an operation 116 of core encoding the right channel (R) of the stereo sound signal 190 in the LRTD stereo mode, and an operation 117 of core encoding the down-mixed mono (M) channel of the stereo sound signal 190 in the DFT stereo mode.

To perform operation 115, the device 100 for coding a stereo sound signal comprises a core encoder 115, for example a mono core encoder. To perform operation 116, the device 100 comprises a core encoder 116, for example a mono core encoder. Finally, to perform operation 167, the device 100 for coding a stereo sound signal comprises a core encoder 117 capable of operating in the DFT stereo mode to code the down-mixed mono (M) channel of the stereo sound signal 190.

It is believed to be within the knowledge of one of ordinary skill in the art to select appropriate core encoders 115, 116 and 117. Accordingly, these encoders will not be further described in the present disclosure.

11. HARDWARE IMPLEMENTATION

Figure 14:
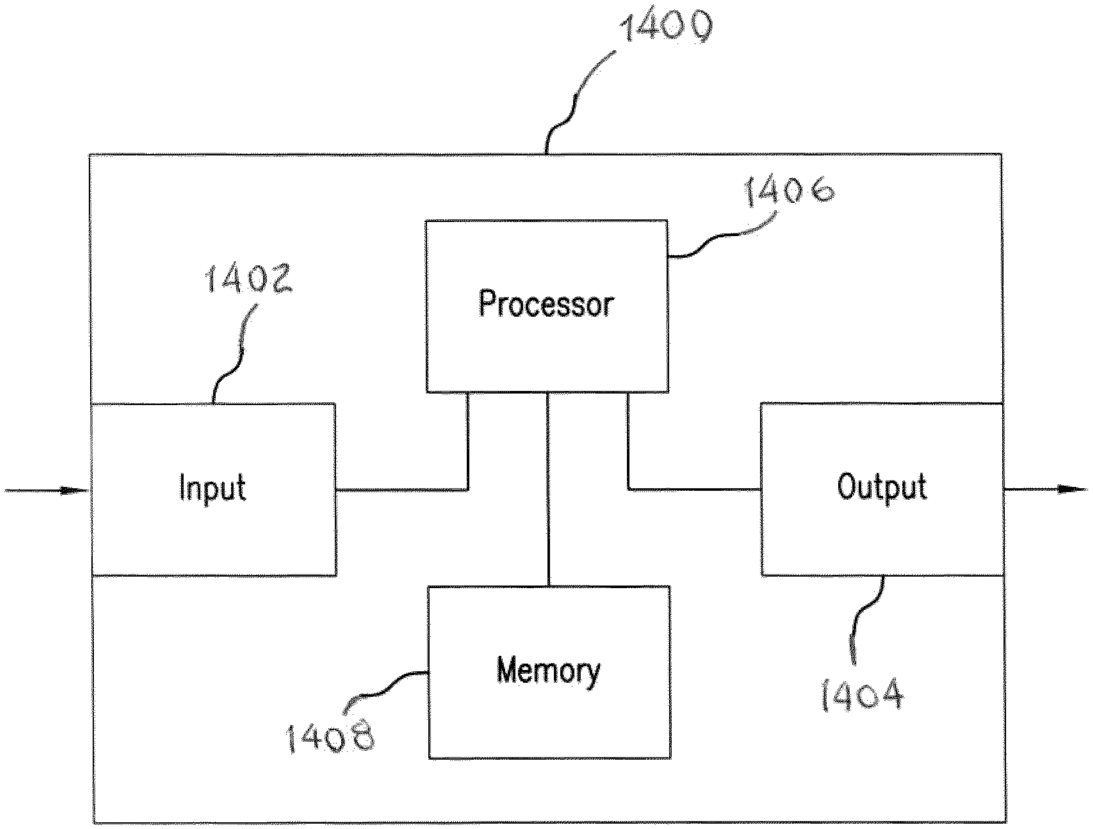
FIG. 14 is a simplified block diagram of an example configuration of hardware components implementing the method and device for coding a stereo sound signal.

FIG. 14 is a simplified block diagram of an example configuration of hardware components forming the above described device 100 and method 150 for coding a stereo sound signal.

The device 100 for coding a stereo sound signal may be implemented as a part of a mobile terminal, as a part of a portable media player, or in any similar device. The device 100 (identified as 1400 in FIG. 14) comprises an input 1402, an output 1404, a processor 1406 and a memory 1408.

The input 1402 is configured to receive the input stereo sound signal 190 of FIG. 1, in digital or analog form. The output 1404 is configured to supply the output, coded stereo sound signal. The input 1402 and the output 1404 may be implemented in a common module, for example a serial input/output device.

The processor 1406 is operatively connected to the input 1402, to the output 1404, and to the memory 1408. The processor 1406 is realized as one or more processors for executing code instructions in support of the functions of the various components of the device 100 for coding a stereo sound signal as illustrated in FIG. 1.

The memory 1408 may comprise a non-transient memory for storing code instructions executable by the processor(s) 1406, specifically, a processor-readable memory comprising/storing non-transitory instructions that, when executed, cause a processor(s) to implement the operations and components of the method 150 and device 100 for coding a stereo sound signal as described in the present disclosure. The memory 1408 may also comprise a random access memory or buffer(s) to store intermediate processing data from the various functions performed by the processor(s) 1406.

Those of ordinary skill in the art will realize that the description of the device 100 and method 150 for coding a stereo sound signal is illustrative only and is not intended to be in any way limiting. Other embodiments will readily suggest themselves to such persons with ordinary skill in the art having the benefit of the present disclosure. Furthermore, the disclosed device 100 and method 150 for coding a stereo sound signal may be customized to offer valuable solutions to existing needs and problems of encoding and decoding sound.

In the interest of clarity, not all of the routine features of the implementations of the device 100 and method 150 for coding a stereo sound signal are shown and described. It will, of course, be appreciated that in the development of any such actual implementation of the device 100 and method 150 for coding a stereo sound signal, numerous implementation-specific decisions may need to be made in order to achieve the developer's specific goals, such as compliance with application-, system-, network- and business-related constraints, and that these specific goals will vary from one implementation to another and from one developer to another. Moreover, it will be appreciated that a development effort might be complex and time-consuming, but would nevertheless be a routine undertaking of engineering for those of ordinary skill in the field of sound processing having the benefit of the present disclosure.

In accordance with the present disclosure, the components/processors/modules, processing operations, and/or data structures described herein may be implemented using various types of operating systems, computing platforms, network devices, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used. Where a method comprising a series of operations and sub-operations is implemented by a processor, computer or a machine and those operations and sub-operations may be stored as a series of non-transitory code instructions readable by the processor, computer or machine, they may be stored on a tangible and/or non-transient medium.

The device 100 and method 150 for coding a stereo sound signal as described herein may use software, firmware, hardware, or any combination(s) of software, firmware, or hardware suitable for the purposes described herein.

In the device 100 and method 150 for coding a stereo sound signal as described herein, the various operations and sub-operations may be performed in various orders and some of the operations and sub-operations may be optional.

Although the present disclosure has been described hereinabove by way of non-restrictive, illustrative embodiments thereof, these embodiments may be modified at will within the scope of the appended claims without departing from the spirit and nature of the present disclosure.

12. REFERENCES

The present disclosure mentions the following references, of which the full content is incorporated herein by reference:

[1] 3GPP TS 26.445, v.12.0.0, "Codec for Enhanced Voice Services (EVS); Detailed Algorithmic Description", September 2014.

[2] M. Neuendorf, M. Multrus, N. Rettelbach, G. Fuchs, J. Robillard, J. Lecompte, S. Wilde, S. Bayer, S. Disch, C. Helmrich, R. Lefevbre, P. Gournay, et al., "The ISO/MPEG Unified Speech and Audio Coding Standard—Consistent High Quality for All Content Types and at All Bit Rates", *J. Audio Eng. Soc.*, vol. 61, no. 12, pp. 956-977, December 2013.

[3] F. Baumgarte, C. Faller, "Binaural cue coding—Part I: Psychoacoustic fundamentals and design principles," IEEE Trans. Speech Audio Processing, vol. 11, pp. 509-519, November 2003.

[4] Tommy Vaillancourt, "Method and system using a long-term correlation difference between left and right channels for time domain down mixing a stereo sound signal into primary and secondary channels," U.S. Pat. No. 10,325,606 B2.

[5] 3GPP SA4 contribution S4-170749 "New WID on EVS Codec Extension for Immersive Voice and Audio Services", SA4 meeting #94, Jun. 26-30, 2017, http://www.3gpp.org/ftp/tsg_sa/WG4_CODEC/TSGS4_94/Docs/54-170749.zip

[6] I. Mani, J. Zhang. "kNN approach to unbalanced data distributions: A case study involving information extraction," In Proceedings of the Workshop on Learning from Imbalanced Data Sets, pp. 1-7, 2003.KNN

[7] V. Malenovsky, T. Vaillancourt, W. Zhe, K. Choo and V. Atti, "Two-stage speech/music classifier with decision smoothing and sharpening in the EVS codec," 2015 IEEE International Conference on Acoustics, Speech and Signal Processing (ICASSP), Brisbane, Q L D, 2015, pp. 5718-5722.

[8] Vaillancourt, T., "Method and system for time-domain down mixing a stereo sound signal into primary and secondary channels using detecting an out-of-phase condition on the left and right channels," U.S. Pat. No. 10,522,157.

[9] Maalouf, Maher. "Logistic regression in data analysis: An overview", 2011 International Journal of Data Analysis Techniques and Strategies. 3. 281-299. 10.1504/IJDATS.2011.041335.

[10] Ruder, S., "An overview of gradient descent optimization algorithms". 2016. ArXiv Preprint ArXiv: 1609.04747.

What is claimed is:

1. A device for selecting one of a first stereo mode and a second stereo mode for coding a stereo sound signal including a left channel and a right channel, comprising:

at least one processor; and a memory coupled to the processor and storing non-transitory instructions that when executed cause the processor to implement:

a classifier for producing a first output indicative of a presence or absence of uncorrelated stereo content in the stereo sound signal;

a detector for producing a second output indicative of a presence or absence of cross-talk in the stereo sound signal caused by two talkers talking simultaneously;

an analysis processor for calculating auxiliary parameters for use in selecting the stereo mode for coding the stereo sound signal; and a stereo mode selector for selecting the stereo mode for coding the stereo sound signal in response to the first output, the second output and the auxiliary parameters, wherein the stereo mode selector:

performs an initial selection of the stereo mode for coding the stereo sound signal between the first and second stereo modes; and selects, following the initial selection of the stereo mode, the second stereo mode for coding the stereo sound signal if a number of given conditions are met.

2. The stereo mode selecting device according to claim 1, wherein the first stereo mode is a time-domain stereo mode in which the left and right channels are coded separately, and the second stereo mode is a frequency-domain stereo mode.

3. The stereo mode selecting device according to claim 1, wherein, in a current frame of the stereo sound signal, the stereo mode selector uses the first output from a previous frame of the stereo sound signal and the second output from the previous frame.

4. The stereo mode selecting device according to claim 1, wherein the stereo mode selector, to perform the initial selection of the stereo mode for coding the stereo sound signal, determines whether a previous frame of the stereo sound signal is a speech frame.

5. The stereo mode selecting device according to claim 4, wherein the stereo mode selector, in the initial selection of the stereo mode, selects the first stereo mode for coding the stereo sound signal if (a) the previous frame is determined as a speech frame, and (b) the first output from the classifier indicates the presence of uncorrelated stereo content in the previous frame or the second output from the detector indicates the presence of cross-talk in the stereo sound signal in the previous frame.

6. The stereo mode selecting device according to claim 5, wherein the stereo mode selector, in the initial selection of the stereo mode for coding the stereo sound signal, selects the second stereo mode for coding the stereo sound signal if (i) condition (a), condition (b) or both conditions (a) and (b) is/are not met and (ii) the stereo mode selected in the previous frame is the second stereo mode.

7. The stereo mode selecting device according to claim 5, wherein the stereo mode selector, in the initial selection of the stereo mode, selects the stereo mode for coding the stereo sound in relation to one of the auxiliary parameters if (i) condition (a), condition (b) or both conditions (a) and (b) is/are not met and (ii) the stereo mode selected in the previous frame is the first stereo mode.

8. The stereo mode selecting device according to claim 7, wherein the one auxiliary parameter is an auxiliary stereo mode switching flag.

9. The stereo mode selecting device according to claim 1, wherein the given conditions are selected from the group consisting of:

the first stereo mode is selected in a previous frame of the stereo sound signal;

the first stereo mode is initially selected in a current frame of the stereo sound signal;

the second output of the detector, in the current frame, is indicative of the presence of cross-talk in the stereo sound signal;

(i) the previous frame is determined as a speech frame, and (ii) the first output from the classifier indicates the presence of uncorrelated stereo content in the previous frame or the second output from the detector indicates the presence of cross-talk in the stereo sound signal in the previous frame;

in the previous frame, a counter of a number of successive frames using the first stereo mode is higher than a first value;

in the previous frame, a counter of a number of successive frames using the second stereo mode is higher than a second value;

in the previous frame, a class of the stereo sound signal is within a pre-defined set of classes; and (i) a total bitrate used for coding the stereo sound signal is equal to or higher than a third value or (ii) a score representative of cross-talk in the stereo sound signal from the detector is smaller than a fourth value in the previous frame.

10. The stereo mode selecting device according to claim 1, wherein the analysis processor calculates, as one of the auxiliary parameters, an auxiliary sub-mode flag indicative of the first stereo mode operating in a sub-mode applied for short transitions before switching from the first stereo mode to the second stereo mode.

11. The stereo mode selecting device according to claim 10, wherein the analysis processor resets the auxiliary sub-mode flag in frames of the stereo sound signal where (a) a previous frame of the stereo sound signal is determined as a speech frame, and (b) the first output from the classifier indicates the presence of uncorrelated stereo content in the previous frame or the second output from the detector indicates the presence of cross-talk in the stereo sound signal in the previous frame.

12. The stereo mode selecting device according to claim 11, wherein the analysis processor resets the auxiliary sub-mode flag to 1 in frames of the stereo sound signal where (1) an auxiliary stereo mode switching flag, calculated by the analysis processor as auxiliary parameter, is equal to 1, (2) the stereo mode of the previous frame is not the first stereo mode, or (3) a counter of frames using the first stereo mode is smaller than a given value.

13. The stereo mode selecting device according to claim 12, wherein the analysis processor resets the auxiliary sub-mode flag to 0 in frames of the stereo sound signal where none of the conditions (1) to (3) is met.

14. The stereo mode selecting device according to claim 10, wherein the analysis processor does not change the auxiliary sub-mode flag in frames of the stereo sound signal where at least one condition amongst the following group of conditions is not met: (a) a previous frame of the stereo sound signal is determined as a speech frame, and (b) the first output from the classifier indicates the presence of uncorrelated stereo content in the previous frame or the second output from the detector indicates the presence of cross-talk in the stereo sound signal in the previous frame.

15. The stereo mode selecting device according to claim 1, wherein the analysis processor calculates, as one of the auxiliary parameters, a counter of a number of consecutive frames of the stereo sound signal using the first stereo mode.

16. The stereo mode selecting device according to claim 15, wherein the analysis processor increments the counter of a number of consecutive frames using the first stereo mode if (a) a previous frame of the stereo sound signal is determined as a speech frame, and (b) the first output from the classifier indicates the presence of uncorrelated stereo content in the previous frame or the second output from the detector indicates the presence of cross-talk in the stereo sound signal in the previous frame.

17. The stereo mode selecting device according to claim 15, wherein the analysis processor resets to zero the counter of a number of consecutive frames using the first stereo mode if the second stereo mode is selected by the stereo mode selector in a current frame of the stereo sound signal.

18. The stereo mode selecting device according to claim 1, wherein the analysis processor calculates, as one of the auxiliary parameters, a counter of a number of consecutive frames using the second stereo mode.

19. The stereo mode selecting device according claim 1, wherein the analysis processor produces, as one of the auxiliary parameters, an auxiliary stereo mode switching flag.

20. The stereo mode selecting device according to claim 19, wherein the analysis processor initializes in a current frame of the stereo sound signal the auxiliary stereo mode switching flag (i) to 1 if (a) a previous frame of the stereo sound signal is determined as a speech frame, and (b) the first output from the classifier indicates the presence of uncorrelated stereo content in the previous frame or the second output from the detector indicates the presence of cross-talk in the stereo sound signal in the previous frame, and (ii) to 0 when condition (a), condition (b) or both conditions (a) and (b) is/are not met.

21. The stereo mode selecting device according to claim 19, wherein the analysis processor sets the auxiliary stereo mode switching flag to 0 when the left and right channels of the stereo sound signal are out-of-phase.

22. The stereo mode selecting device according to claim 8, wherein the analysis processor produces, as one of the auxiliary parameters, the auxiliary stereo mode switching flag.

23. The stereo mode selecting device according to claim 22, wherein the analysis processor initializes in a current frame of the stereo sound signal the auxiliary stereo mode switching flag (i) to 1 if (a) the previous frame is determined as a speech frame, and (b) the first output from the classifier indicates the presence of uncorrelated stereo content in the previous frame or the second output from the detector indicates the presence of cross-talk in the stereo sound signal in the previous frame, and (ii) to 0 when condition (a), condition (b) or both conditions (a) and (b) is/are not met.

24. The stereo mode selecting device according to claim 22, wherein the analysis processor sets the auxiliary stereo mode switching flag to 0 when the left and right channels of the stereo sound signal are out-of-phase.

25. A device for selecting one of a first stereo mode and a second stereo mode for coding a stereo sound signal including a left channel and a right channel, comprising:

a classifier producing a first output indicative of a presence or absence of uncorrelated stereo content in the stereo sound signal;

a detector producing a second output indicative of a presence or absence of cross-talk in the stereo sound signal;

an analysis processor calculating auxiliary parameters for use in selecting the stereo mode for coding the stereo sound signal; and a stereo mode selector selecting the stereo mode for coding a stereo sound signal in response to the first output, the second output and the auxiliary parameters, wherein the stereo mode selector:

performs an initial selection of the stereo mode for coding the stereo sound signal between the first and second stereo modes; and selects, following the initial selection of the stereo mode, the second stereo mode for coding the stereo sound signal if a number of given conditions are met.

26. A device for selecting one of a first stereo mode and a second stereo mode for coding a stereo sound signal including a left channel and a right channel, comprising:

at least one processor; and a memory coupled to the processor and comprising non-transitory instructions that when executed cause the processor to:

produce a first output indicative of a presence or absence of uncorrelated stereo content in the stereo sound signal caused by two talkers talking simultaneously;

produce a second output indicative of a presence or absence of cross-talk in the stereo sound signal caused by two talkers talking simultaneously;

calculate auxiliary parameters for use in selecting the stereo mode for coding the stereo sound signal; and select the stereo mode for coding the stereo sound signal in response to the first output, the second output and the auxiliary parameters, wherein, to select the stereo mode for coding the stereo sound signal, the processor:

performs an initial selection of the stereo mode for coding the stereo sound signal between the first and second stereo modes; and selects, following the initial selection of the stereo mode, the second stereo mode for coding the stereo sound signal if a number of given conditions are met.

27. A method for selecting one of a first stereo mode and a second stereo mode for coding a stereo sound signal including a left channel and a right channel, comprising:

producing a first output indicative of a presence or absence of uncorrelated stereo content in the stereo sound signal;

producing a second output indicative of a presence or absence of cross-talk in the stereo sound signal caused by two talkers talking simultaneously;

calculating auxiliary parameters for use in selecting the stereo mode for coding the stereo sound signal; and selecting the stereo mode for coding the stereo sound signal in response to the first output, the second output and the auxiliary parameters, wherein selecting the stereo mode for coding the stereo sound signal comprises:

performing an initial selection of the stereo mode for coding the stereo sound signal between the first and second stereo modes; and selecting, following the initial selection of the stereo mode, the second stereo mode for coding the stereo sound signal if a number of given conditions are met.

28. The stereo mode selecting method according to claim 27, wherein the first stereo mode is a time-domain stereo mode in which the left and right channels are coded separately, and the second stereo mode is a frequency-domain stereo mode.

29. The stereo mode selecting method according to claim 27, wherein, in a current frame of the stereo sound signal, selecting the stereo mode comprises using the first output from a previous frame of the stereo sound signal and the second output from the previous frame.

30. The stereo mode selecting method according to claim 27, wherein selecting the stereo mode comprises, to perform the initial selection of the stereo mode for coding the stereo sound signal, determining whether a previous frame of the stereo sound signal is a speech frame.

31. The stereo mode selecting method according to claim 30, wherein selecting the stereo mode comprises, in the initial selection of the stereo mode, selecting the first stereo mode for coding the stereo sound signal if (a) the previous frame is determined as a speech frame, and (b) the first output indicates the presence of uncorrelated stereo content in the previous frame or the second output indicates the presence of cross-talk in the stereo sound signal in the previous frame.

32. The stereo mode selecting method according to claim 31, wherein selecting the stereo mode comprises, in the initial selection of the stereo mode for coding the stereo sound signal, selecting the second stereo mode for coding the stereo sound signal if (i) condition (a), condition (b) or both conditions (a) and (b) is/are not met and (ii) the stereo mode selected in the previous frame is the second stereo mode.

33. The stereo mode selecting method according to claim 31, wherein selecting the stereo mode comprises, in the initial selection of the stereo mode, selecting the stereo mode for coding the stereo sound in relation to one of the auxiliary parameters if (i) condition (a), condition (b) or both conditions (a) and (b) is/are not met and (ii) the stereo mode selected in the previous frame is the first stereo mode.

34. The stereo mode selecting method according to claim 33, wherein the one auxiliary parameter is an auxiliary stereo mode switching flag.

35. The stereo mode selecting method according to claim 27, wherein the given conditions are selected from the group consisting of:

the first stereo mode is selected in a previous frame of the stereo sound signal;

the first stereo mode is initially selected in a current frame of the stereo sound signal;

the second output, in the current frame, is indicative of the presence of cross-talk in the stereo sound signal;

(i) the previous frame is determined as a speech frame, and (ii) the first output indicates the presence of uncorrelated stereo content in the previous frame or the second output indicates the presence of cross-talk in the stereo sound signal in the previous frame;

in the previous frame, a counter of a number of successive frames using the first stereo mode is higher than a first value;

in the previous frame, a counter of a number of successive frames using the second stereo mode is higher than a second value;

in the previous frame, a class of the stereo sound signal is within a pre-defined set of classes; and (i) a total bitrate used for coding the stereo sound signal is equal to or higher than a third value or (ii) a score representative of cross-talk in the stereo sound signal is smaller than a fourth value in the previous frame.

36. The stereo mode selecting method according to claim 27, wherein calculating the auxiliary parameters comprises calculating, as one of the auxiliary parameters, an auxiliary sub-mode flag indicative of the first stereo mode operating in a sub-mode applied for short transitions before switching from the first stereo mode to the second stereo mode.

37. The stereo mode selecting method according to claim 36, wherein calculating the auxiliary parameters comprises resetting the auxiliary sub-mode flag in frames of the stereo sound signal where (a) a previous frame of the stereo sound signal is determined as a speech frame, and (b) the first output indicates the presence of uncorrelated stereo content in the previous frame or the second output indicates the presence of cross-talk in the stereo sound signal in the previous frame.

38. The stereo mode selecting method according to claim 37, wherein calculating the auxiliary parameters comprises resetting the auxiliary sub-mode flag to 1 in frames of the stereo sound signal where (1) an auxiliary stereo mode switching flag, calculated as auxiliary parameter, is equal to 1, (2) the stereo mode of the previous frame is not the first stereo mode, or (3) a counter of frames using the first stereo mode is smaller than a given value.

39. The stereo mode selecting method according to claim 38, wherein calculating the auxiliary parameters comprises resetting the auxiliary sub-mode flag to 0 in frames of the stereo sound signal where none of the conditions (1) to (3) is met.

40. The stereo mode selecting method according to claim 36, wherein calculating the auxiliary parameters comprises making no change to the auxiliary sub-mode flag in frames of the stereo sound signal where at least one condition amongst the following group of conditions is not met: (a) a previous frame of the stereo sound signal is determined as a speech frame, and (b) the first output indicates the presence of uncorrelated stereo content in the previous frame or the second output indicates the presence of cross-talk in the stereo sound signal in the previous frame.

41. The stereo mode selecting method according to claim 27, wherein calculating the auxiliary parameters comprises calculating, as one of the auxiliary parameters, a counter of a number of consecutive frames using the first stereo mode.

42. The stereo mode selecting method according to claim 41, wherein calculating the auxiliary parameters comprises incrementing the counter of a number of consecutive frames using the first stereo mode if (a) a previous frame of the stereo sound signal is determined as a speech frame, and (b) the first output indicates the presence of uncorrelated stereo content in the previous frame or the second output indicates the presence of cross-talk in the stereo sound signal in the previous frame.

43. The stereo mode selecting method according to claim 41, wherein calculating the auxiliary parameters comprises resetting to zero the counter of a number of consecutive frames using the first stereo mode if the second stereo mode is selected in a current frame of the stereo sound signal.

44. The stereo mode selecting method according claim 27, wherein calculating the auxiliary parameters comprises calculating, as one of the auxiliary parameters, a counter of a number of consecutive frames using the second stereo mode.

45. The stereo mode selecting method according to claim 27, wherein calculating the auxiliary parameters comprises producing, as one of the auxiliary parameters, an auxiliary stereo mode switching flag.

46. The stereo mode selecting method according to claim 45, wherein calculating the auxiliary parameters comprises initializing in a current frame of the stereo sound signal the auxiliary stereo mode switching flag (i) to 1 if (a) a previous frame of the stereo sound signal is determined as a speech frame, and (b) the first output indicates the presence of uncorrelated stereo content in the previous frame or the second output indicates the presence of cross-talk in the stereo sound signal in the previous frame, and (ii) to 0 when condition (a), condition (b) or both conditions (a) and (b) is/are not met.

47. The stereo mode selecting method according to claim 45, wherein calculating the auxiliary parameters comprises setting the auxiliary stereo mode switching flag to 0 when the left and right channels of the stereo sound signal are out-of-phase.

48. The stereo mode selecting method according to claim 34, wherein calculating the auxiliary parameters comprises producing, as one of the auxiliary parameters, the auxiliary stereo mode switching flag.

49. The stereo mode selecting method according to claim 48, wherein calculating the auxiliary parameters comprises initializing in a current frame the auxiliary stereo mode switching flag (i) to 1 if (a) the previous frame is determined as a speech frame, and (b) the first output indicates the presence of uncorrelated stereo content in the previous frame or the second output indicates the presence of cross-talk in the stereo sound signal in the previous frame, and (ii) to 0 when condition (a), condition (b) or both conditions (a) and (b) is/are not met.

50. The stereo mode selecting method according to claim 48, wherein calculating the auxiliary parameters comprises setting the auxiliary stereo mode switching flag to 0 when the left and right channels of the stereo sound signal are out-of-phase.

* * * * *